United States Patent
Goto et al.

(10) Patent No.: US 11,344,864 B2
(45) Date of Patent: May 31, 2022

(54) DIESEL ENGINE EXHAUST GAS PURIFICATION CATALYST, PRODUCTION METHOD THEREFOR, AND EXHAUST GAS PURIFICATION METHOD USING THE SAME

(71) Applicant: UMICORE SHOKUBAI JAPAN CO., LTD., Tokoname (JP)

(72) Inventors: Yosuke Goto, Kobe (JP); Tatsuya Kumon, Kobe (JP); Franz Dornhaus, Kobe (JP)

(73) Assignee: UMICORE SHOKUBAI JAPAN CO., LTD., Tokoname (JP)

( * ) Notice: Subject to any disclaimer, the term of this patent is extended or adjusted under 35 U.S.C. 154(b) by 0 days.

(21) Appl. No.: 17/284,953

(22) PCT Filed: Nov. 11, 2019

(86) PCT No.: PCT/JP2019/044190
§ 371 (c)(1),
(2) Date: Apr. 13, 2021

(87) PCT Pub. No.: WO2020/100830
PCT Pub. Date: May 22, 2020

(65) Prior Publication Data
US 2021/0379566 A1 Dec. 9, 2021

(30) Foreign Application Priority Data
Nov. 12, 2018 (JP) .............................. JP2018-212051

(51) Int. Cl.
*B01D 53/94* (2006.01)
*B01J 21/14* (2006.01)
(Continued)

(52) U.S. Cl.
CPC ............ *B01J 23/44* (2013.01); *B01D 53/944* (2013.01); *B01D 53/9468* (2013.01);
(Continued)

(58) Field of Classification Search
CPC ...... B01D 2255/9207; B01D 2258/012; B01D 2255/1021; B01D 53/9468;
(Continued)

(56) References Cited

U.S. PATENT DOCUMENTS

| | | |
|---|---|---|
| 2010/0063341 A1 | 3/2010 | Heng et al. |
| 2010/0239478 A1* | 9/2010 | Arnold ................. B01J 37/0217 423/213.2 |

(Continued)

FOREIGN PATENT DOCUMENTS

| | | |
|---|---|---|
| JP | 2005021818 A | 1/2005 |
| JP | 2006314894 A | 11/2006 |

(Continued)

OTHER PUBLICATIONS

Extended European Search Report dated Dec. 2, 2021, by the European Patent Office in corresponding European Patent Application No. 19883593.6. (7 pages).

(Continued)

*Primary Examiner* — Timothy C Vanoy
(74) *Attorney, Agent, or Firm* — Buchanan Ingersoll & Rooney PC

(57) ABSTRACT

It is an object to provide a catalyst that can effectively purify exhaust gas, in particular, carbon monoxide (CO) in exhaust gas, emitted from a diesel engine, a production method therefor, and an exhaust gas purification method using the same. A diesel engine exhaust gas purification catalyst for purifying exhaust gas emitted from a diesel engine of the present invention comprises a precious metal and alumina and/or zeolite supported on a three-dimensional structure, (Continued)

and has peaks for not less than three different pore sizes in a pore size distribution measured by the mercury intrusion method, wherein one of the peaks is a peak 2 at a pore size of not less than 0.3 μm and less than 1.0 μm, and the pore volume of the peak 2 being greater than 3.1% of the total pore volume.

9 Claims, 3 Drawing Sheets

(51) Int. Cl.
B01J 23/44 (2006.01)
B01J 35/00 (2006.01)
B01J 35/02 (2006.01)
B01J 35/10 (2006.01)
B01J 37/00 (2006.01)
B01J 37/02 (2006.01)
B01J 37/04 (2006.01)
B01J 37/08 (2006.01)
F01N 3/28 (2006.01)

(52) U.S. Cl.
CPC ........... *B01J 21/14* (2013.01); *B01J 35/0006* (2013.01); *B01J 35/023* (2013.01); *B01J 35/1061* (2013.01); *B01J 35/1066* (2013.01); *B01J 35/1071* (2013.01); *B01J 35/1076* (2013.01); *B01J 37/0018* (2013.01); *B01J 37/0219* (2013.01); *B01J 37/04* (2013.01); *B01J 37/082* (2013.01); *F01N 3/2803* (2013.01); *B01D 2255/1021* (2013.01); *B01D 2255/1023* (2013.01); *B01D 2255/2092* (2013.01); *B01D 2255/50* (2013.01); *B01D 2255/9022* (2013.01); *B01D 2255/9155* (2013.01); *B01D 2255/9202* (2013.01); *F01N 2330/06* (2013.01); *F01N 2330/30* (2013.01); *F01N 2370/04* (2013.01)

(58) Field of Classification Search
CPC .......... B01D 2255/9022; B01D 53/944; B01D 2255/50; B01D 2255/9202; B01D 2255/9155; B01J 23/44; B01J 35/1076; B01J 35/1071; B01J 37/0201; B01J 37/04; B01J 21/14; B01J 37/0244; B01J 35/0006; B01J 29/7007; B01J 37/0203; B01J 21/12; B01J 35/1095; B01J 37/082; B01J 35/1066; B01J 23/63; B01J 37/0219; B01J 35/1061; B01J 37/0018; B01J 35/04; B01J 37/0246; B01J 37/0248; B01J 35/1019; B01J 35/023; F01N 2330/30; F01N 3/2803; F01N 3/10; F01N 2330/06

See application file for complete search history.

(56) References Cited

U.S. PATENT DOCUMENTS

| 2011/0200506 A1 | 8/2011 | Ono et al. |
| 2016/0272547 A1 | 9/2016 | Kikuchi et al. |
| 2021/0245147 A1* | 8/2021 | Hosoi .................. B01J 35/109 |
| 2021/0354110 A1* | 11/2021 | Ogino .................. B01J 21/04 |

FOREIGN PATENT DOCUMENTS

| JP | 2009072693 A | 4/2009 |
| JP | 2015199066 A | 11/2015 |
| JP | 2016175810 A | 10/2016 |
| JP | 2017141778 A | 8/2017 |
| JP | 2017217646 A | 12/2017 |
| WO | 2008114771 A1 | 9/2008 |
| WO | 2010044453 A1 | 4/2010 |
| WO | 2017209083 A1 | 12/2017 |

OTHER PUBLICATIONS

International Search Report (PCT/ISA/210) with an English translation, and Written Opinion (PCT/ISA/237) dated Dec. 17, 2019, by the Japanese Patent Office as the International Searching Authority for International Application No. PCT/JP2019/044190.

* cited by examiner

DIESEL ENGINE EXHAUST GAS PURIFICATION CATALYST, PRODUCTION METHOD THEREFOR, AND EXHAUST GAS PURIFICATION METHOD USING THE SAME

TECHNICAL FIELD

The present invention relates to a catalyst for purifying exhaust gas emitted from a diesel engine, a method for producing the catalyst, and a method for purifying exhaust gas emitted from a diesel engine using the catalyst.

BACKGROUND OF THE INVENTION

Numerous conventional technologies have been proposed for treating exhaust gas generated from internal combustion engines. For the treatment of exhaust gas from diesel engines, in particular, various technologies have been proposed with the objective of reducing particulate matter (PM) or NOx contained in the exhaust gas. For example, oxidation catalysts which oxidize carbon monoxide (also referred to as "CO" hereinafter) and hydrocarbons (also referred to as "HC" hereinafter) into carbon dioxide ($CO_2$) or water ($H_2O$), NOx storage-reduction catalysts which store nitrogen oxides (also referred to as "NOx" hereinafter) in an oxidizing atmosphere and reduce and purify stored NOx in a reducing atmosphere, and the like have been proposed as catalysts for purifying exhaust gas.

In recent years, the production of a porous catalyst using a pore-forming agent having the same average pore size as PM (Japanese Unexamined Patent Application Publication No. 2009-72693) and the use of a pore-forming material to hold catalyst particles on the surface of a porous substrate (Japanese Unexamined Patent Application Publication No. 2015-199066) have been disclosed as measures for reducing PM.

SUMMARY OF THE INVENTION

Technical Problem

However, although the conventional catalysts described in Japanese Unexamined Patent Application Publication No. 2009-72693 and Japanese Unexamined Patent Application Publication No. 2015-199066 are effective for removing PM, sufficient purification performance cannot be exhibited for exhaust gas, particularly CO and the like.

Therefore, the present invention was conceived in consideration of the circumstances described above, and an object thereof is to provide a catalyst that can effectively purify exhaust gas, in particular, carbon monoxide (CO) in exhaust gas, emitted from a diesel engine, a production method therefor, and an exhaust gas purification method using the same.

Solution to Problem

The present inventors conducted diligent research to solve the problem described above. As a result, the present inventors discovered that a catalyst having peaks for not less than three different pore sizes in a pore size distribution measured by the mercury intrusion method can solve the problem described above, and thereby achieved the present invention.

Namely, a first aspect of the present invention relates to a diesel engine exhaust gas purification catalyst for purifying exhaust gas emitted from a diesel engine; a precious metal and alumina and/or zeolite being supported on a three-dimensional structure; the catalyst having peaks for not less than three different pore sizes in a pore size distribution measured by the mercury intrusion method; one of the peaks being a peak 2 at a pore size of not less than 0.3 µm and less than 1.0 µm; and the pore volume of said peak 2 being greater than 3.1% of the total pore volume.

A second aspect of the present invention is a production method for a diesel engine exhaust gas purification catalyst, the method including: preparing a slurry by mixing a pore connecting agent having a combustion decomposition temperature of not lower than 300° C. and lower than 450° C., a precious metal precursor, and at least one of alumina and a zeolite; applying the slurry to a three-dimensional structure; and then holding the three-dimensional structure in air at a temperature higher than −170° C. and not higher than −20° C. relative to said combustion decomposition temperature.

A third aspect of the present invention relates to a diesel engine exhaust gas purification method, the method including treating exhaust gas emitted from a diesel engine using the exhaust gas purification catalyst of the present invention.

BRIEF DESCRIPTION OF DRAWINGS

In FIGS. 1A-1C, 1 is a pore having a small pore size (connected pore 1); 2 is a pore having an intermediate pore size (connected pore 2); and 3 is a pore having a large pore size (connected pore 3); 10, 10', and 10" are catalysts; 12 is an exhaust gas; 13 is a pore having a large pore size; 13' is a pore having a small pore size; 14, 14', and 14" are catalyst layers; and 15, 15', and 15" are three-dimensional structures.

DESCRIPTION OF EMBODIMENTS

Figure 1A:
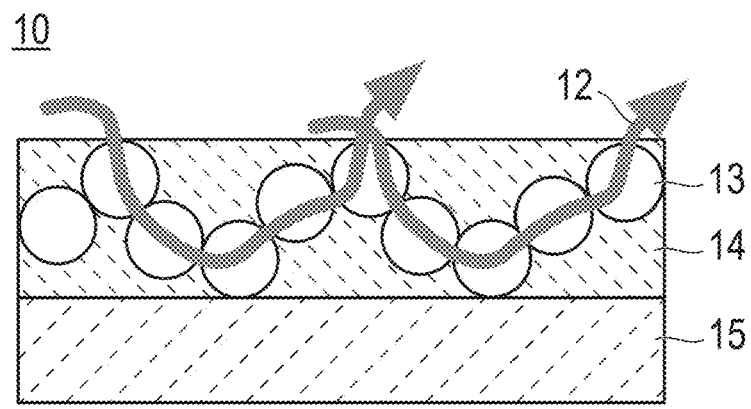
FIGS. 1A-1C are a drawing for explaining an exhaust gas purification mechanism according to a catalyst of the present invention.

The first aspect of the present invention relates to a diesel engine exhaust gas purification catalyst for purifying exhaust gas emitted from a diesel engine; the catalyst including a precious metal and alumina and/or zeolite supported on a three-dimensional structure; the catalyst having peaks for not less than three different pore sizes in a pore size distribution measured by the mercury intrusion method; one of the peaks being a peak 2 at a pore size of not less than 0.3 µm and less than 1.0 µm; and the pore volume of the peak 2 being greater than 3.1% of the total pore volume. Alternatively, the first aspect of the present invention relates to the use of a diesel engine exhaust gas purification catalyst in the purification of exhaust gas emitted from a diesel engine; the catalyst including a precious metal and alumina and/or zeolite supported on a three-dimensional structure; the catalyst having peaks for not less than three different pore sizes in a pore size distribution measured by the mercury intrusion method; one of the peaks being a peak 2 at a pore size of not less than 0.3 µm and less than 1.0 µm; and the pore volume of the peak 2 being greater than 3.1% of the total pore volume. By using the catalyst of the present invention, it is possible to effectively purify exhaust gas, in particular, carbon monoxide (CO) in exhaust gas, emitted from a diesel engine. In the present specification, a "diesel engine exhaust gas purification catalyst" is also referred to simply as an "exhaust gas purification catalyst" or a "catalyst". In addition, unless otherwise indicated, "exhaust gas" refers to "diesel engine exhaust gas".

The second aspect of the present invention relates to a production method for a diesel engine exhaust gas purification catalyst, the method including: preparing a slurry by mixing a pore connecting agent having a combustion decomposition temperature of not lower than 300° C. and lower than 450° C., a precious metal precursor, and at least one of alumina and zeolite; applying the slurry to a three-dimensional structure; and then holding the three-dimensional structure in air at a temperature higher than −170° C. and not higher than −20° C. relative to the combustion decomposition temperature.

The third aspect of the present invention relates to a diesel engine exhaust gas purification method, the method including treating exhaust gas (in particular, purifying carbon monoxide (CO) in exhaust gas) emitted from a diesel engine using the exhaust gas purification catalyst of the present invention.

In the present specification, descriptions of certain aspects of the present invention may be appropriately modified and applied to other aspects.

The catalyst of the present invention is characterized in that peaks exist at three different pore sizes in the pore size distribution and that one of the peaks exists within a specific pore size range and at a specific pore volume ratio. By having such a pore size distribution, exhaust gas, in particular, carbon monoxide (CO), emitted from a diesel engine can be effectively purified. Although the mechanism for achieving the above effect is unclear, the mechanism is speculated to be as follows. Note that the present invention is not limited by the following speculation.

Figure 1B:
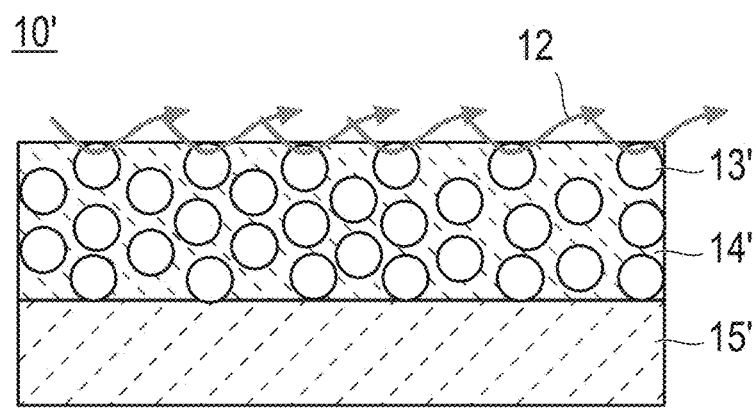
Figure 1C:
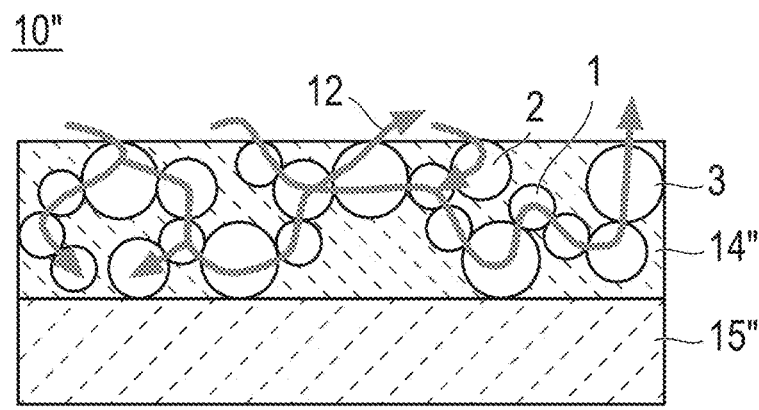

Namely, the conventional catalysts described in Japanese Unexamined Patent Application Publication No. 2009-72693 and Japanese Unexamined Patent Application Publication No. 2015-199066 have relatively large (for example, 1 μm or greater) pores, and the linking of pores is insufficient. Therefore, although the catalyst is effective for PM having a large particle size, the catalyst may not exhibit sufficient purification performance and may be disadvantageous for CO, or the like, which is a gas having a substantially smaller molecular size than the size of the pore-forming agent (pore-forming material). As a result of investigating the problems described above, the present inventors hypothesized that simply creating pores using such a pore-forming agent (pore-forming material) increases the CO that passes through the pores without coming into contact with the catalyst components and thereby reduces the CO purification rate. That is, when exhaust gas 12 is fed to a catalyst 10, most pores of which are pores 13 of a large pore size, as described in Japanese Unexamined Patent Application Publication No. 2009-72693 or Japanese Unexamined Patent Application Publication No. 2015-199066, the exhaust gas 12 diffuses and passes through the pores 13 of the catalyst layer 14 very smoothly, as illustrated in FIG. 1A. Therefore, since the contact with the catalyst components (precious metal) in the catalyst layer 14 is short (insufficient), such a catalyst cannot effectively purify the exhaust gas. On the other hand, in the case of a catalyst 10', most pores of which are pores 13' of a small pore size, the pores are those of alumina or zeolite and are not holes formed in the course of the catalyst preparation. Therefore, there are few or no pores 13' that are connected to one another. Thus, when the exhaust gas 12 is fed to such a catalyst 10', most of the exhaust gas 12 passes through the surface of the catalyst layer 14' and cannot diffuse to the pores 13' within the catalyst layer 14', as illustrated in FIG. 1B, and there is little to no contact between the exhaust gas 12 and the catalyst layer 14', in particular, the catalyst components (precious metal) within the catalyst layer 14' (on the three-dimensional structure 15' side). Therefore, even such a catalyst cannot effectively purify the exhaust gas. In contrast, in the case of a catalyst 10" which, in addition to pores 3 of a large pore size (connected pores 3 described below) and pores 1 of a small pore size (connected pores 1 described below), has pores 2 of an intermediate pore size between the above pore sizes (connected pores 2 described below) at a specific pore volume (specific ratio with respect to the total pore volume), the pores 1, 2, and 3 connect to one another within the catalyst layer 14", as illustrated in FIG. 1C. As a result, the exhaust gas 12 penetrates into the pores 1, 2, and 3 of the catalyst layer 14" and diffuses into most of the pores via the connected portions of each of the pores. In addition, since the ease of flow of the exhaust gas differs for the pores 1, 2, and 3 having different pore sizes, the exhaust gas accumulates in the pores for an appropriate period of time. Therefore, with such a catalyst, contact can be established with the catalyst components (precious metal) inside the catalyst layer 14" (on the three-dimensional structure 15" side) efficiently and for an appropriate period of time, which increases the contact efficiency between the exhaust gas and the catalyst components (precious metal) and enables the efficient purification of the exhaust gas. Accordingly, by using the catalyst of the present invention, it is possible to effectively purify exhaust gas, in particular, carbon monoxide), emitted from a diesel engine.

The above effect can be exhibited in the same manner regardless of the temperature of the exhaust gas. Therefore, when the catalyst of the present invention is used, it is possible to exhibit an excellent exhaust gas treating effect (in particular, CO purification properties) for low-temperature exhaust gas of 50 to 600° C. (in particular, including HC, CO, NOx, water vapor, or the like) or low-temperature exhaust gas of 50 to 600° C. after having been exposed to high-temperature exhaust gas of 650 to 900° C. (in particular, including HC, CO, NOx, water vapor, or the like) from an internal combustion engine for a long period of time.

In addition, the actions and effects described above (diffusion and accumulation of exhaust gas within the catalyst layer and therefore efficient contact between the exhaust gas and the catalyst component) are particularly prominent when the pores 3 (connected pores 3 described below) have an appropriate pore size and/or are present at a moderate ratio with respect to the total pore volume.

Embodiments of the present invention will be described hereinafter. Note that the present invention is not limited to only the embodiments described below. Moreover, in the present specification, "from X to Y" representing a range includes X and Y and means "not less than X and not greater than Y". In addition, unless otherwise indicated, operations and measurements of physical properties and the like are performed at room temperature (20 to 25° C.)

<Diesel Engine Exhaust Gas Purification Catalyst>

The exhaust gas purification catalyst of the present invention is a catalyst used for the purpose of purifying exhaust gas emitted from a diesel engine. Exhaust gas emitted from a diesel engine differs greatly from exhaust gas emitted from a gasoline engine in many respects, such as the presence of particulate matter (PM), the composition of the exhaust gas (for example, CO, NOx, or HC), and the fact that HC chain lengths are longer than those emitted from a gasoline engine.

Therefore, a catalyst having excellent properties for purifying exhaust gas emitted from a diesel engine does not necessarily have excellent properties for purifying exhaust gas emitted from a gasoline engine.

In addition, the exhaust gas purification catalyst of the present invention includes a precious metal and alumina and/or zeolite supported on a three-dimensional structure; the catalyst having peaks for not less than three different pore sizes in a pore size distribution measured by the mercury intrusion method; one of the peaks being a peak 2 at a pore size of not less than 0.3 μm and less than 1.0 μm; and the pore volume of the peak 2 being greater than 3.1% of the total pore volume. As described above, in the catalyst layer, pores of different pore sizes (large, intermediate, and small) are present while being connected to one another, and intermediate pores, in particular, are present at a specific pore volume (specific ratio with respect to the total pore volume). As a result, the exhaust gas penetrates into the pores within the catalyst layer on the three-dimensional structure side and diffuses and accumulates moderately in the pores as a whole via the linked portions of each of the pores. Therefore, the catalyst components (precious metal) inside the catalyst layer efficiently come into contact with the exhaust gas, and the utilization efficiency of the catalyst components (and therefore the exhaust gas purification properties) can be improved. In addition, since the catalyst of the present invention is characterized by its own pore size distribution, the effect of the catalyst of the present invention does not depend on the temperature of the exhaust gas. Therefore, it is possible to achieve an excellent exhaust gas treating effect (in particular, CO purification properties) not only for exhaust gas having a low temperature of 50 to 600° C. (in particular, including HC, CO, NOx, water vapor, or the like), but also for exhaust gas having a low temperature of 50 to 600° C. after having been exposed for a long period of time to exhaust gas having a high temperature of 650 to 900° C. (in particular, including HC, CO, NOx, water vapor, or the like) from an internal combustion engine, in which the exhaust gas treating properties decrease.

The exhaust gas purification catalyst of the present invention has peaks for not less than three different pore sizes in a pore size distribution measured by the mercury intrusion method; one of the peaks being a peak 2 at a pore size of not less than 0.3 μm and less than 1.0 μm; and the pore volume of the peak 2 being greater than 3.1% of the total pore volume. Here, when the pore size at which the peak 2 is observed is less than 0.3 μm, the pores are too small, which makes the exhaust gas less likely to penetrate and diffuse into the pores and reduces transferring between pores. As a result, the contact between the catalyst components (precious metal) inside the catalyst layer and the exhaust gas is poor, and the catalyst performance decreases. Conversely, when the pore size at which the peak 2 is observed is 1.0 μm or greater, the pore size is too large, and the exhaust gas diffuses and passes through the pores smoothly. As a result, the contact with the catalyst components (precious metal) inside the catalyst layer is short (insufficient), and therefore the exhaust gas cannot be effectively purified. Taking into consideration the ease of intrusion and diffusion of the exhaust gas into the pores, the ease of transferring between the pores, and the like, the pore size at which the peak 2 (peak of intermediate pores) is observed is preferably greater than 0.4 μm and less than 0.9 μm, more preferably greater than 0.5 μm and less than 0.85 μm, and particularly preferably not less than 0.6 μm and less than 0.8 μm (in particular, not less than 0.60 μm and less than 0.80 μm). Here, for a peak other than the peak described above, the pore size at which the peak is observed is not particularly limited. Taking into consideration the ease of intrusion and diffusion of the exhaust gas into the pores, the ease of transferring between the pores, and the like, the pore size at which a peak of large pores (peak 3) is observed from among the pore sizes at which peaks are observed for a catalyst having peaks for three different pore sizes including large, intermediate (peak 2), and small pore sizes is preferably not less than 1.5 μm and not greater than 3.5 μm, more preferably greater than 1.7 μm and less than 3.0 μm, and particularly preferably greater than 1.90 μm and less than 2.60 μm. That is, according to a preferable embodiment of the present invention, there is a peak at a pore size of not less than 0.3 μm and less than 1.0 μm (peak 2) and a peak at a pore size of not less than 1.5 μm and not greater than 3.5 μm (peak 3) in the pore size distribution measured by the mercury intrusion method. In addition, according to a more preferable embodiment of the present invention, there is a peak 2 at a pore size of greater than 0.4 μm and less than 0.9 μm and a peak 3 at a pore size of not less than 1.5 μm and not greater than 3.5 μm in the pore size distribution measured by the mercury intrusion method. According to an even more preferable embodiment of the present invention, there is a peak 2 at at a pore size of greater than 0.5 μm and less than 0.85 μm and a peak 3 at a pore size of not less than 1.7 μm and not greater than 3.0 μm in the pore size distribution measured by the mercury intrusion method. According to a particularly preferable embodiment of the present invention, there is a peak 2 at a pore size of not less than 0.6 μm and less than 0.8 μm (in particular, not less than 0.60 μm and less than 0.80 μm) and a peak 3 at a pore size of greater than 1.90 μm and less than 2.60 μm in the pore size distribution measured by the mercury intrusion method. In addition, taking into consideration the ease of intrusion and diffusion of the exhaust gas into the pores, the ease of transferring between the pores, and the like, the pore size at which a peak of small pores (peak 1) is observed is preferably not less than 0.001 μm and not greater than 0.05 μm and more preferably greater than 0.007 μm and less than 0.017 μm. That is, according to a preferable embodiment of the present invention, there is a peak 1 at a pore size not less than 0.001 μm and not greater than 0.05 in the pore size distribution measured by the mercury intrusion method. In addition, according to a more preferable embodiment of the present invention, there is a peak 1 at a pore size of greater than 0.007 μm and less than 0.017 in the pore size distribution measured by the mercury intrusion method. Note that hereinafter, the peak 1 at a pore size of not less than 0.001 μm and not greater than 0.05 μm (in particular, greater than 0.007 μm and less than 0.017 μm) is called "peak 1"; the peak 2 at a pore size of not less than 0.3 μm and less than 1.0 μm (greater than 0.4 μm and less than 0.9 μm, greater than 0.5 μm and less than 0.85 μm, or not less than 0.6 μm and less than 0.8 μm (in particular, not less than 0.60 μm and less than 0.80 μm)) is called "peak 2"; and the peak 3 at a pore size of not less than 1.5 μm and not greater than 3.5 μm (greater than 1.7 μm and less than 3.0 μm, or greater than 1.90 μm and less than 2.60 μm) is called "peak 3".

In the present specification, a "peak" is a peak in a pore size distribution (differential pore size distribution) curve obtained by plotting a value (dV/d(log D)) equal to the differential pore volume (dV) divided by the differential value (d(log D)) of the logarithm of the pore size (D) with respect to D, and the log differential pore volume at this peak is greater than 2.5% of the total pore volume. Therefore, cases in which the log differential pore volume is not greater than 2.5% of the total pore volume are not included in the term "peak".

In this specification, "at least three different pore sizes in the pore size distribution measured by the mercury intrusion method" refers to the pore sizes corresponding to the aforementioned peaks in the pore size distribution.

Of the peaks 1 to 3 described above, the pore volume of the peak 2 is greater than 3.1% of the total pore volume. Here, when the pore volume of the peak 2 is not greater than 3.1% of the total pore volume, the volume of intermediate pores (connected pores 2 described below) is insufficient, which makes the exhaust gas less likely to penetrate and diffuse into the pores and reduces transferring between pores. As a result, the contact between the catalyst components (precious metal) inside the catalyst layer and the exhaust gas is poor, and the catalyst performance decreases (see catalyst H below). Taking into consideration the ease of intrusion and diffusion of the exhaust gas into the pores, the ease of transferring between the pores, and the like, the pore volume at the pore size of the peak 2 is preferably greater than 3.1% and not greater than 8.0%, more preferably not less than 3.2% and less than 4.0%, and particularly preferably not less than 3.2% and not greater than 3.7%. Here, the pore volume of a peak other than that of peak 1 is not particularly limited. Taking into consideration the ease of transferring between the pores and the like, the pore volume at the pore size of the peak 1 is preferably greater than 8%, more preferably greater than 12% and less than 20%, and particularly preferably not less than 15.5% and less than 16.9% of the total pore volume. Similarly, taking into consideration the ease of intrusion and diffusion of the exhaust gas into the pores, the ease of transferring between the pores, and the like, the pore volume at the pore size of the peak 3 is preferably not less than 2.6%, more preferably not less than 2.7%, and particularly preferably not less than 3.0% of the total pore volume. In addition, the pore volume at the pore size of the peak 3 is preferably not greater than 8.0%, more preferably not greater than 4.5%, and particularly preferably less than 3.5% of the total pore volume. Of these peaks, as described above, the peaks 2 and 3 have a substantial effect on the ease of intrusion and diffusion of the exhaust gas into the pores and the ease of transferring between the pores. Therefore, in a preferable mode of the present invention, the pore volume of the peak 3 is not less than 2.6% and not greater than 8.0% of the total pore volume. In a more preferable mode of the present invention, the pore volume of the peak 3 is not less than 2.7% and not greater than 4.5% of the total pore volume. In a particularly preferable mode of the present invention, the pore volume of the peak 3 is not less than 3.0% and less than 3.5% of the total pore volume. In addition, in a preferable mode of the present invention, the pore size distribution has a peak 3 at a pore size of not less than 1.5 µm and not greater than 3.5 µm, and the pore volume at the pore size of the peak 3 is not greater than 4.5% of the total pore volume.

Here, the "pore volume of the peak" is defined as the log differential pore volume (cc/g, mL/g) of the peak determined as described above.

The ratio (%) of the pore volume of the peak to the total pore volume is calculated by dividing the pore volume of each peak determined as described above by the total pore volume (cumulative pore volume of the entire pore size distribution) and multiplying the result by 100 [=(pore volume of the peak/total pore volume)×100].

The pore size distribution, the pore size, and the pore volume can be measured by known methods, however, measurement by the mercury intrusion method is preferable. In the present specification, the pore size, the pore volume, and the pore size distribution are measured with reference to the "Catalyst Handbook", edited by the Catalyst Society of Japan, Kodansha, 2008, p. 144. Note that in order to distinguish the pores of the catalyst from the pores of the three-dimensional structure such as a cordierite carrier, measurements are performed after coating the three-dimensional structure with the catalyst components (that is, in a state of the catalyst as a final product in which the precious metal, alumina, zeolite, or the like is supported on the three-dimensional structure). More specifically, the pore size distribution, the pore volume, and the ratio (%) of the pore volume of each pore to the total pore volume are measured by the following methods.

—Pore Size Distribution Measurement—

The pore size distribution (differential pore size distribution) of each catalyst is determined by measuring the mercury intrusion curve at a measurement pressure of 1 to 60,000 psia (corresponding to a measured pore size of 0.001 to 1000 µm) after decompression treatment for one hour at 200° C. Here, the mercury intrusion method is based on the law of capillarity, and in the case of mercury and cylindrical pores, this law is expressed by the formula: $D=-(1/P)4\gamma \cos \theta$ (where D represents the pore size (µm); P represents the measured pressure (psia); $\gamma$ represents the surface tension (dyn/cm); and $\theta$ represents the contact angle (°)). That is, the mercury intrusion method measures the volume of mercury penetrating the pores as a function of the measured pressure P. The pore size distribution is the distribution of D (pore size) calculated as a function of P (measured pressure). The total pore volume is a value equal to the cumulative value of the pore volume in which mercury is pressed to the maximum pressure at the time of measurement (cc(mL)) divided by the catalyst mass (g). In addition, the average pore size (diameter) is the average value of D calculated as a function of P. Note that the surface tension of mercury is 484 dyn/cm, and the contact angle is 130°.

In the obtained pore size distribution, connected pores 1, 2, and 3 are defined in order of the magnitude of the log differential pore volume of each peak. For these connected pores 1, 2, and 3, the pore size (pore diameter) of each peak and the ratio (%) of the pore volume of the peak to the total pore volume are determined.

The catalyst of the present invention includes a catalyst layer containing a precious metal, alumina, and/or zeolite formed on a three-dimensional structure. Here, the catalyst layer may be a single layer formed on the three-dimensional structure, or two or more catalyst layers may be formed on the three-dimensional structure. Taking into consideration the exhaust gas (in particular, CO) purifying properties, it is preferable for two or more catalyst layers to be formed on the three-dimensional structure. That is, in a preferable mode of the present invention, at least two catalyst layers are laminated and supported on a three-dimensional structure. In addition, in the preferable mode described above, the number of laminated catalyst layers is not particularly limited, however, taking into consideration the exhaust gas (in particular, CO) purifying properties, the ease of production, and the balance thereof, there are preferably 2 or 3 layers and particularly preferably 2 layers. In addition, although it is sufficient for at least one layer of the at least two catalyst layers to have the specific pore size distribution according to the present invention (which may be formed using the pore described in detail below), it is preferable for all of the catalyst layers to have the specific pore size distribution according to the present invention (formed using the described in detail below). That is, in a particularly preferable mode of the present invention, two layers are formed on a three-dimensional structure, and both of the layers have the specific pore size distribution according to the present invention (formed using the pore connecting agent). Further, when two or more catalyst layers are formed on a three-dimensional structure, each of the catalyst layers may have the same or a different composition, however, it is preferable for each catalyst layer to have a different composition. For example, when two catalyst layers are formed on a three-dimensional structure, the following compositions, and the like, are possible: (i) a catalyst layer containing a precious metal, alumina and zeolite, and, if necessary, other added components described in detail below and a catalyst layer containing a precious metal, alumina, and, if necessary, other added components described in detail below (substantially free of zeolite) are formed on a three-dimensional structure; (ii) a catalyst layer containing a precious metal, alumina and zeolite, and, if necessary, other added components described in detail below and a catalyst layer containing a precious metal, zeolite, and, if necessary, other added components described below (substantially free of alumina) are formed on a three-dimensional structure; and (iii) a catalyst layer containing a precious metal, alumina, and, if necessary, other added components described below (substantially free of zeolite) and a catalyst layer containing a precious metal, zeolite, and, if necessary, other added components described below (substantially free of alumina) are formed on a three-dimensional structure. Among the above, (i) is preferable, and it is preferable for a lower catalyst layer containing a precious metal, alumina and zeolite, and, if necessary, other added components described below (three-dimensional structure side) and an upper catalyst layer containing a precious metal, alumina, and, if necessary, other added components described below (surface layer side exposed to the exhaust gas) to be formed sequentially on the three-dimensional structure. Note that "substantially free of X" means that the content of X is from 0 to 5 mass % and preferably approximately 0 mass %. For example, the upper catalyst layer being substantially free of zeolite means that the content of zeolite in the upper catalyst layer is from 0 to 5 mass % and preferably approximately 0 mass %.

Precious Metal

The catalyst of the present invention necessarily contains a precious metal (catalyst component). Here, the type of the precious metal is not particularly limited, however, specific examples thereof include platinum (Pt), palladium (Pd), and rhodium (Rh). These precious metals may be used alone, or two or more types thereof may be used in combination. Among the same, the precious metal is preferably platinum and/or palladium and more preferably platinum and palladium. That is, according to a preferable mode of the present invention, the precious metal is at least one of platinum and palladium. In accordance with a more preferable mode of the present invention, the precious metals are platinum and palladium.

Here, the amount of platinum (Pt) that is used is not particularly limited, however, taking into consideration the exhaust gas (in particular, CO) purifying properties, the amount is preferably from 0.01 to 20 g, more preferably from 0.05 to 10 g, and most preferably greater than 0.5 g and less than 5 g in terms of precious metal per 1 liter of the three-dimensional structure.

The amount of palladium (Pd) that is used is not particularly limited, however, taking into consideration the exhaust gas (in particular, CO) purifying properties, the amount is preferably from 0.01 to 20 g, more preferably from 0.05 to 5 g, and most preferably from 0.3 to 3 g in terms of precious metal per 1 liter of the three-dimensional structure.

The amount of rhodium (Rh) that is used is not particularly limited, however, taking into consideration the exhaust gas (in particular, CO) purifying properties, the amount is preferably from 0.01 to 20 g, more preferably from 0.05 to 5 g, and most preferably from 0.3 to 3 g in terms of precious metal per 1 liter of the three-dimensional structure.

In addition, when the precious metals are platinum and palladium, the mixing ratio of platinum and palladium (platinum:palladium (mass ratio)) is preferably from 50:1 to 1:1, from 40:1 to 1:1, from 30:1 to 1.1:1, from 20:1 to 1.3:1, or from 5:1 to 1.5:1 in this order. The CO purification efficiency can be improved as the range of the mixing ratio of platinum and palladium falls within the preferable range described above.

The precious metal source (precious metal starting material) is not particularly limited, and raw materials used in this field such as water-soluble precious metal salts and precious metal complexes can be used. These may be modified and used in accordance with the method of preparing the catalyst. Specific examples of starting materials of platinum (Pt) (platinum sources) include halides such as platinum bromide and platinum chloride; inorganic salts of platinum such as nitrates, dinitrodiamine salts, tetraammine salts, hexaammine salts, sulfates, ammonium salts, amine salts, bis-ethanolamine salts, bis-acetylacetonate salts, carbonates, bicarbonates, nitrites, and oxalates; carboxylates of platinum such as formates; and hydroxides, alkoxides, hexahydroxo acid salts, and oxides of platinum. Among the same, nitrates (platinum nitrate), dinitrodiammine salts (dinitrodiammine platinum), chlorides (platinum chloride), tetraammine salts (tetraammine platinum), hexaammine salts (hexaammine platinum), and hexahydroxo acid salts are preferable. Note that, in the present invention, the platinum source may be a single source or a mixture of two or more kinds. Examples of starting materials of palladium (Pd) (palladium sources) include halides such as palladium chloride; inorganic salts of palladium such as nitrates, sulfates, acetates, ammonium salts, amine salts, tetraammine salts, hexaammine salts, carbonates, bicarbonates, nitrites, and oxalates; carboxylates of palladium such as formates; and hydroxides, alkoxides, and oxides of palladium. Among the same, (nitrates (palladium nitrate), tetraammine salts (tetraammine palladium), hexaammine salts (hexaammine palladium), carboxylates, and hydroxides are preferable. Note that, in the present invention, the palladium source may be a single source or a mixture of two or more kinds. Examples of starting materials of rhodium (Rh) (rhodium sources) include inorganic salts of rhodium such as ammonium salts, amine salts, hexaammine salts, carbonates, bicarbonates, nitrates, nitrites, and oxalates; carboxylates of rhodium such as formates; and hydroxides, alkoxides, and oxides of rhodium. Among the same, nitrates, ammonium salts, amine salts, hexaammine salts, and carbonates are preferable. Note that, in the present invention, the rhodium source may be a single source or a mixture of two or more kinds.

The amount of the precious metal source is not particularly limited, however, an amount that allows the content (supported amount) of each precious metal described above to be achieved is preferable. Note that when two or more types of precious metal sources are used in combination, the total amount of the precious metal sources is preferably an amount that allows the contents (supported amounts) of the precious metals described above to be achieved.

Alumina

The alumina used in the catalyst of the present invention is not particularly limited as long as the alumina contains an oxide of aluminum, and examples thereof include activated alumina such as γ-, δ-, η-, and θ-alumina, lanthana-containing alumina, silica-containing alumina, silica-titania-containing alumina, and silica-titania-zirconia-containing alumina. One type of alumina may be used alone, or two or more types thereof may be used in combination. Among the same, lanthana-containing alumina or silica-containing alumina is preferable from the perspective of high-temperature durability, and silica-containing alumina is particularly preferable from the perspective of sulfur poisoning resistance. Note that in the present specification, an X-containing alumina means that the alumina contains aluminum at a ratio greater than half of the total amount (molar ratio in terms of metal) and contains the X component at the remaining ratio. For example, in the case of silica-titania-containing alumina, the ratio of moles of aluminum (Al) to the total moles of silicon (Si), titanium (Ti), and aluminum (Al) constituting the silica-titania-containing alumina [=Al/(Si+Ti+Al)] is greater than 0.5.

The properties of the alumina are not particularly limited, however, from the perspectives of suppressing degradation at the temperature of the exhaust gas, heat resistance, and the like, it is preferable for there to be little change in specific surface area at 700° C. or higher and preferably 1000° or higher. From the above perspective, the melting point of the alumina is preferably not lower than 1000° C., more preferably from 1000 to 3000° C., and even more preferably from 1500 to 3000° C.

In addition, the BET specific surface area of the alumina is not particularly limited, however, from the perspective of supporting the catalyst component, the BET specific surface area is preferably from 50 to 750 $m^2/g$ and more preferably from 150 to 750 $m^2/g$. With such a specific surface area, a sufficient amount of the precious metal (catalyst component) can be supported on the alumina, which makes it possible to increase the contact area between the catalyst components and the exhaust gas or to adsorb the reactant. As a result, reactivity of the entire catalyst can be further increased.

The shape of the alumina is not particularly limited, and any shape such as granular, particulate, powdery, cylindrical, conical, prismatic, cubic, pyramidal, or amorphous, for example, may be used, however, the alumina is preferably granular, particulate, or powdery and more preferably powdery. When the alumina is granular, particulate, or powdery, the average secondary particle size of the alumina is preferably from 5 to 155 μm and more preferably from 21 to 89 μm. Within such a range, the catalyst components can be efficiently supported on the alumina surface. Note that in the present specification, the average secondary particle sizes of alumina and zeolite can be measured by a laser diffraction/scattering type particle size distribution measurement device. Note that in the present specification, the "particle size" refers to the maximum distance among the distances between any two points on the contour line of the granular, particulate, or powdery sample.

The content (supported amount) of alumina is not particularly limited, however, the content is preferably from 10 to 300 g and more preferably from 50 to 200 g per 1 L of the three-dimensional structure. When the content of alumina per 1 L of the three-dimensional structure is 10 g or greater, the precious metal can be sufficiently dispersed in the alumina, and a catalyst that is more sufficiently durable can be obtained. On the other hand, when the content of alumina is 300 g or less, the contact state between the precious metal and the exhaust gas is good, and exhaust gas purification performance can be exhibited more sufficiently.

Zeolite

The catalyst of the present invention necessarily contains zeolite in place of or in addition to the alumina described above. That is, the catalyst of the present invention (a) necessarily contains a precious metal and alumina, (b) necessarily contains a precious metal and zeolite, or (c) necessarily contains a precious metal, alumina, and zeolite. Among the same, (b) and (c) are preferable, and (c) is particularly preferable.

Zeolites (hydrous aluminosilicates) can adsorb hydrocarbons (HC) and nitrogen oxides (NOx) in exhaust gas. The type of zeolite is not particularly limited, and either a natural or synthetic zeolite may be used. Specifically, A-type, X-type, Y-type, L-type, beta-type (BEA-type), ZSM-type, CHA-type, ferrierite-type, linde-type, faujasite-type, MCM-22-type, mordenite-type, or the like can be used.

The content (supported amount) of zeolite is not particularly limited, however, the content is preferably from 1 to 150 g, more preferably not less than 5 g and less than 100 g, and even more preferably from 20 to 60 g per 1 L of the three-dimensional structure. Within the range described above, hydrocarbons (HC) and nitrogen oxides (NOx) in the exhaust gas can be sufficiently adsorbed.

In addition, when the catalyst according to the present invention contains alumina and zeolite, the mixing ratio of alumina and zeolite is not particularly limited. Specifically, the mixing ratio (mass ratio) of alumina and zeolite is preferably from 10:1 to 1:10, more preferably from 10:2 to 5:10, and most preferably from 10:3 to 10:10. With such a ratio, a sufficient amount of the precious metal (catalyst component) can be supported on alumina, which makes it possible to increase the contact area between the catalyst components and the exhaust gas and allows zeolite to sufficiently adsorb hydrocarbons (HC) and nitrogen oxides (NOx) in the exhaust gas. As a result, the reactivity of the entire catalyst can be further increased, and the exhaust gas purification performance can be further increased.

In addition, the BET specific surface area of the zeolite is not particularly limited, however, from the perspective of the adsorption of hydrocarbons (HC) and nitrogen oxides (NOx) in the exhaust gas, the BET specific surface area is preferably from 320 to 830 $m^2/g$ and more preferably from 390 to 830 $m^2/g$. With such a specific surface area, hydrocarbons (HC) and nitrogen oxides (NOx) in the exhaust gas can be sufficiently adsorbed.

The shape of the zeolite is not particularly limited, and any shape such as granular, particulate, powdery, cylindrical, conical, prismatic, cubic, pyramidal, or amorphous may be used, for example, however, the alumina is preferably granular, particulate, or powdery and more preferably powdery. When the zeolite is granular, particulate, or powdery, the average primary particle size of the zeolite is preferably from 5 to 20 nm and more preferably from 5 to 10 nm. In addition, the average secondary particle size of the zeolite is preferably from 0.3 to 8.1 μm and more preferably from 0.4 to 3.7 μm. Within such a range, hydrocarbons (HC) and nitrogen oxides (NOx) in the exhaust gas can be sufficiently adsorbed. Note that in the present specification, the shape and average primary particle size of the zeolite can be measured by a transmission electron microscope (TEM). In addition, in the present specification, the average secondary particle size of the zeolite can be measured with a laser diffraction/scattering type particle size distribution measurement device such as LA-920.

Pore Connecting Agent The specific pore size distribution according to the present invention, which is described in detail below, is controlled by the pore connecting agent and the pore connecting conditions (in particular, the combustion decomposition temperature and the pore connecting temperature). It is speculated that when the slurry contains a pore connecting agent in this way, the specific pore size distribution according to the present invention is achieved as follows. Note that the present invention is not limited by the following speculation. For example, in the pore size distribution, three peaks having a large log differential pore volume are selected, and among these three peaks, the connected pores 1, connected pores 2, and connected pores 3 are defined in ascending order of pore size. Among the same, the connected pores 1 have the smallest pore size and are presumed to be pores present in alumina and/or zeolite. On the other hand, the connected pores 3 are pores having the largest pore diameter as a peak and are presumed to be pores corresponding to the peak 3 described above. In addition, the connected pores 2 are pores having a pore size between those of the connected pores 1 and 3 described above as a peak and are presumed to be pores corresponding to the peak 2 described above. It is presumed that these connected pores 2 and 3 are pores derived from a pore connecting agent (pores formed by a pore connecting agent). Specifically, the connected pores 2 are pores formed by a mass of gas generated when the pore connecting agent is combusted in the pore connecting step described below. In addition, the connected pores 3 are pores formed by a mass of gas generated when the pore connecting agent is combusted in the connecting step described below, or by the combustion of pore connecting agent at once in the calcining step described below. By mixing the pore connecting agent into a slurry, the pores of peaks 2 and 3 can be formed efficiently in the pore connecting step (d) or the calcining step (e) described below. Note that hereinafter, the connected pores 1 described above are called "connected pores 1", the connected pores 2 described above are called "connected pores 2", and the connected pores 3 described above are called "connected pores 3".

Note that the fact that "the catalyst has pores (connected pores) derived from a pore connecting agent" can be determined by a known method such as elemental analysis. For example, when the pore connecting agent contains carbon atoms, the presence or absence of the pore connecting agent can be examined by measuring the carbon content in the catalyst by a known method such as elemental analysis. More specifically, the amount of carbon (C) ($C_1$ amount (mass %)) in the catalyst is measured by elemental analysis. When the amount of carbon is not less than 0.04 mass %, it is assessed that the catalyst has pores derived from the pore connecting agent. Note that in the present specification, the amount of carbon in the catalyst is measured in accordance with the following method. A sample for elemental analysis is prepared by cutting the catalyst, collecting a central portion 50 to 70 mm from the end face of the catalyst near the center of the catalyst, and peeling the catalyst layer from the collected sample while using a microscope. Elemental analysis is performed using a fully automatic elemental analyzer Vario EL Cube (manufactured by Elementar) in accordance with the manufacturer's instructions.

The pore connecting agent has a combustion decomposition temperature of not lower than 300° C. and lower than 450° C. Here, when the combustion decomposition temperature of the pore connecting agent is lower than 300° C., the evaporation of water that could not be removed in the drying step described below and the combustion of the pore connecting agent occur simultaneously, and thus preferable connected pores 2 are not formed. Therefore, the specific pore size distribution according to the present invention cannot be achieved. In addition, when the combustion decomposition temperature of the pore connecting agent is 450° C. or higher, the decomposition of nitrates and the combustion of organic components proceed simultaneously and in parallel because the combustion decomposition temperature of the pore connecting agent and the calcining temperature are close to one another. Thus, the specific pore size distribution according to the present invention cannot be achieved. Taking into consideration the ease of controlling the specific pore size distribution according to the present invention, operability, and the like, the combustion decomposition temperature of the pore connecting agent is preferably from 310 to 430° C., more preferably not lower than 320° C. and lower than 400° C., and particularly preferably higher than 350° C. and not higher than 390° C. When the combustion decomposition temperature is within the range described above, the temperature is close to the combustion decomposition temperature of other organic components in the slurry, and the connecting of pores progresses more efficiently. The pore connecting agent having such a combustion decomposition temperature is not limited to the following, however, examples include methyl polymethacrylate (combustion decomposition temperature: 373° C.), rice starch (combustion decomposition temperature: 320° C.), and melamine cyanurate. Among the same, methyl polymethacrylate and rice starch are preferable, and methyl polymethacrylate is more preferable. Here, the combustion decomposition temperature can be measured by a known method but is preferably measured using TG-DTA (Thermogravimetry-Differential Thermal Analysis). In the present specification, the combustion decomposition temperature is measured by the following method in the examples described below.

The average particle size of the pore connecting agent is one important factor for obtaining a suitable pore size distribution according to the present invention. The average particle size of the pore connecting agent is preferably not less than 0.4 μm, more preferably greater than 1 μm, even more preferably not less than 2 μm, and particularly preferably not less than 3 μm. In addition, in order to obtain a suitable pore size distribution according to the present invention, the upper limit of the average particle size of the pore connecting agent is preferably not greater than 15 μm, more preferably less than 10 μm, even more preferably not greater than 6 μm, and particularly preferably not greater than 5 μm. Namely, in a preferable mode of the present invention, the average particle size of the pore connecting agent is not less than 0.4 μm and not greater than 15 μm. In a more preferable mode of the present invention, the average particle size of the pore connecting agent is greater than 1 μm and less than 10 μm. In an even more preferable mode of the present invention, the average particle size of the pore connecting agent is not less than 2 μm and not greater than 6 μm (in particular, not less than 3 μm and not greater than 5 μm). Note that the average particle size of the pore connecting agent described above is determined by randomly selecting arbitrary particles from a scanning electron microscope image, measuring the diameters of 100 particles, and calculating the number average thereof.

The amount of the pore connecting agent that is used (used amount) is not particularly limited as long as the pore size distribution according to the present invention can be obtained, but is an important factor for obtaining a suitable pore size distribution according to the present invention. The amount of the pore connecting agent that is used (used amount) is such that the content of the pore connecting agent in the slurry is preferably not greater than 15 mass %, more preferably less than 10 mass %, and particularly preferably not greater than 6 mass % in terms of solid content. Namely, in a preferable mode of the present invention, the content of the pore connecting agent in the slurry is not greater than 6 mass % in terms of solid content. Note that the lower limit of the content of the pore connecting agent in the slurry is not particularly limited, however, the content is ordinarily not less than 1 mass % and preferably not less than 2 mass %. Namely, in a preferable mode of the present invention, the pore connecting agent is mixed at a ratio such that the content of the pore connecting agent in the slurry is not less than 1 mass % and not greater than 15 mass % (not less than 1 mass % and less than 10 mass %, not less than 2 mass % and not greater than 6 mass %) in terms of solid content. With such an amount, the pore connecting agents 2 and 3 having the pore sizes and pore volumes of the peaks 2 and 3 described above can be formed more easily by the pore connecting agents. In addition, the connected pores 1, 2, and 3 can connect to one another more easily.

Note that when at least two catalyst layers are laminated and supported on a three-dimensional structure, slurries (preferable content of the pore connecting agent in the slurry (in terms of solid matter)=not greater than 15 mass %) are preferably applied sequentially to the three-dimensional structure. Namely, in a preferable mode of the present invention, slurries having a pore connecting agent content of not greater than 15 mass % in terms of solid content are laminated on the three-dimensional structure as at least two different catalyst layers. Note that the content of the pore connecting agent in each slurry in the preferable mode described above is not particularly limited, however, each is preferably within the range described above (in terms of solid matter). In addition, the content of the pore connecting agent in each slurry in the preferable mode described above may be the same or different.

Other Added Components

The catalyst of the present invention may further contain other added components in addition to the precious metal and alumina and/or zeolite as long as the added components do not diminish the effect of the catalyst of the present invention. Here, the other added components are not particularly limited, and components that can ordinarily be used in this field can be similarly used. Specific examples include alkali metals, alkali earth metals, rare earth metals, or oxides or sulfides thereof.

Examples of alkali metals include lithium, sodium, potassium, rubidium, and cesium, and potassium is preferable. Examples of alkali earth metals include calcium, strontium, and barium, and barium is preferable. Here, alkali metals and alkali earth metals may each be blended alone or in the form of a mixture of two or more types thereof, or at least one type of alkali metal and at least one type of alkali earth metal may be combined and blended. The content (supported amount) of the alkali metal is not particularly limited but is preferably from 0.5 to 40 g, more preferably from 1 to 25 g, and particularly preferably from 3 to 18 g per 1 L of the three-dimensional structure in terms of oxide. In addition, the content (supported amount) of the alkali earth metal is not particularly limited but is preferably from 0.5 to 40 g, more preferably from 1 to 25 g, and particularly preferably from 3 to 18 g per 1 L of the three-dimensional structure in terms of oxide.

The rare earth metal is not particularly limited, however, examples thereof include lanthanum (La), neodymium (Nd), yttrium (Y), scandium (Sc), and praseodymium (Pr). Among the same, lanthanum, neodymium, yttrium, and praseodymium are preferable, and lanthanum and praseodymium are more preferable. These rare earth metals may be contained alone, or two or more types thereof may be contained in combination. In addition, the rare earth metal may be in the form of a metal as it is, or may be in the form of an oxide or a sulfide. The content (supported amount) of the rare earth metal is not particularly limited but is preferably from 0.5 to 40 g, more preferably from 1 to 25 g, and particularly preferably from 3 to 18 g per 1 L of the three-dimensional structure in terms of oxide.

Three-Dimensional Structure

The catalyst of the present invention includes a precious metal and alumina and/or zeolite supported on a three-dimensional structure.

Here, the three-dimensional structure is not particularly limited, and a refractory three-dimensional structure that is ordinarily used in this field can be similarly used. As the three-dimensional structure, for example, a refractory carrier such as a honeycomb carrier having channels (gas passage holes, cell shapes) with a triangular shape, a rectangular shape, or a hexagonal shape can be used. The three-dimensional structure is preferably an integrally molded structure (three-dimensional integral structure, integral weir structure), and for example, a monolith carrier, a metal honeycomb carrier, a plugged honeycomb carrier having a filter function such as a diesel particulate filter, a punching metal, or the like may be preferably used. Note that it is not absolutely necessary for the structure to be a three-dimensional integral structure, and a pellet carrier or the like, for example, may also be used. In addition, spherical and corrugated carriers may be used, and these materials may be made of a ceramic or a metal. As a ceramic, cordierite, mullite, SiC, and the like can be used.

A monolith carrier may be a carrier commonly known as a ceramic honeycomb carrier. In particular, a carrier containing cordierite, mullite, alumina, α-alumina, silicon carbide, silicon nitride, or the like as a material is preferable, and among the same, a carrier made of cordierite (cordierite carrier) is particularly preferable. In addition, an integral structure formed using an oxidation-resistant, refractory metal including stainless steel, an Fe—Cr—Al alloy, or the like may be used.

These monolith carriers are produced by an extrusion molding method, a method of winding and solidifying a sheet-like element, or the like. The shape of the channels (gas passage holes, cell shapes) may be hexagonal (honeycomb), rectangular, triangular, or corrugated (corrugation shape). The channels can be adequately used as long as the cell density (number of cells/unit cross-sectional area) is from 100 to 1200 cells/square inch, and the cell density is preferably from 200 to 900 cells/square inch, more preferably from 200 to 600 cells/square inch, and even more preferably from 250 to 500 cells/square inch (1 inch=25.4 mm).

Production Method for Exhaust Gas Purification Catalyst

The exhaust gas purification catalyst of the present invention can be produced by appropriately referencing a known technique, however, as described above, the catalyst of the present invention has peaks for not less than three different pore sizes. In order to obtain such a structure, it is important to apply a slurry containing a pore connecting agent having a specific combustion decomposition temperature (not lower than 300° C. and lower than 450° C.) in addition to the catalyst components to the three-dimensional structure and then holding (heat treating) the structure at a specific temperature difference relative to the combustion decomposition temperature described above.

Namely, the present invention also provides a production method for a diesel engine exhaust gas purification catalyst, the method including: preparing a slurry by mixing a pore connecting agent having a combustion decomposition temperature of not lower than 300° C. and lower than 450° C., a precious metal precursor, and alumina and/or zeolite; applying the slurry to a three-dimensional structure; and then holding the three-dimensional structure in air at a temperature higher than −170° C. and not higher than −20° C. relative to the combustion decomposition temperature (second aspect of the present invention). The specific pore size distribution according to the present invention is achieved by performing heat treatment under specific temperature conditions using a specific pore connecting agent.

In the following, a production method for an exhaust gas purification catalyst according to the present invention will be described as a preferable mode of the present invention. The production method includes: (a) a slurry preparation step, (b) a slurry application step, (c) a drying step, (d) a pore connecting step, and (e) a calcining step. Note that for configurations other than the characteristic part of the present invention ((d) pore connecting step), known methods other than those described below can be applied in the same manner or with appropriate modifications, and the present invention is not limited only by the preferable modes described below. In addition, in the following, a "pore connecting agent having a combustion decomposition temperature of not lower than 300° C. and lower than 450° C." is also simply called a "pore connecting agent".

(a) Slurry Preparation Step

In this step, a slurry is prepared by mixing a pore connecting agent, a precious metal source (precious metal precursor), alumina and/or zeolite, and, if necessary, other added components [a slurry containing raw materials that ultimately form each of the catalyst components (precious metal, alumina, zeolite, and the like) and a pore connecting agent is prepared]. The slurry is prepared by mixing and wet-milling the raw materials of each of the catalyst components and the pore connecting agent in an aqueous medium. Note that ordinary materials used in this field can be appropriately used as the raw materials of each of the catalyst components. For example, since the alumina or zeolite is the same as described above (type, supported amount, and the like), a description thereof is omitted here. In addition, when the catalyst of the present invention contains other added components, since each of the added components is the same as described above (type, supported amount, and the like), a description thereof is omitted here. Note that, since the descriptions of the pore connecting agent, the precious metal source, alumina, zeolite, and other added components are the same as above, descriptions thereof are omitted here.

As an aqueous medium, for example, water (purified water, ultrapure water, deionized water, distilled water, or the like), a lower alcohol such as ethanol or 2-propanol, an organic alkaline aqueous solution, or the like can be used. Among the same, water or a lower alcohol is preferably used, and water is more preferably used. The amount of the aqueous medium is not particularly limited, however, the amount is preferably such that the ratio of solid content in the slurry (solid content mass concentration) is from 5 to 60 mass % and more preferably from 10 to 50 mass %. The ratio of solid content can be calculated from the ratio of the mass of solid content remaining after calcining in air for 30 minutes at 550° C. relative to the mass of the slurry before calcining for 30 minutes at 550° C. The slurry also contains a pore connecting agent having a combustion decomposition temperature of not lower than 300° C. and lower than 450° C.

Here, the order in which the precious metal source, alumina and/or zeolite, the pore connecting agent, other added components, and the like are added is not particularly limited, and the components may be added collectively to aqueous medium or may be added separately in an appropriate order. For example, alumina and/or zeolite and the pore connecting agent may be added to the aqueous medium and stirred for 5 minutes to 24 hours, the precious metal source may then be added and stirred for 5 minutes to 24 hours, and other added components such as zeolite may then be added. Alternatively, alumina and/or zeolite may be added to the aqueous medium and stirred for 5 minutes to 24 hours, the pore connecting agent may then be added and stirred for 5 minutes to 24 hours, and after the precious metal source is then added and stirred for 5 minutes to 24 hours, other added components such as zeolite may be added. In the above, when one or two or more catalyst layers are formed on the three-dimensional structure, the pH of the mixture (slurry) after the addition of each raw material is adjusted to 6 or higher and preferably 7 or higher and lower than 8. Therefore, when the pH of the mixture (slurry) after each addition step is 8 or higher, the pH is preferably adjusted to lower than 8 using an acid such as hydrochloric acid, sulfuric acid, nitric acid, or carbonic acid. In addition, when the pH of the mixture (slurry) after each addition step falls below the lower limit described above (lower than 6), the pH is adjusted to 6 or higher and preferably 7 or higher using a base such as ammonia, sodium hydroxide, potassium hydroxide, sodium carbonate, or potassium carbonate.

Next, the slurry obtained in this way is wet-milled. Here, wet milling can be performed by a known method using a ball mill, for example. In addition, the wet milling conditions are not particularly limited. For example, wet milling is preferably performed for 5 minutes to 5 hours at a rotational speed of 50 to 5000 rpm. By wet-milling under such conditions, the average particle size of the pore connecting agent becomes around 5 μm (or less). Note that the stirring described above may also be performed by wet milling.

Note that when the exhaust gas purification catalyst has two or more catalyst layers, a slurry corresponding to each of the catalyst layers is prepared. For example, when forming two catalyst layers (a lower catalyst layer and an upper catalyst layer) on the three-dimensional structure, a first slurry for forming the lower catalyst layer and a second slurry for forming the upper catalyst layer are prepared in the slurry preparation step. The first and second slurries may have different compositions and may contain, for example, different precious metals from one another. Specifically, one of the first and second slurries may be prepared containing a Pd (PdO) source, while the other is prepared containing a Pt source.

(b) Slurry Application Step

In this step, the slurry obtained in the slurry preparation step (a) described above is applied to the three-dimensional structure. A known method such as wash coating may be appropriately used as the method for applying the slurry to the three-dimensional structure. The applied amount of slurry may be appropriately set by a person skilled in the art according to the amount of solid matter in the slurry and the thickness of the catalyst layer to be formed. The applied amount of the slurry is preferably an amount such that the contents of the precious metal, alumina and/or zeolite, and any other added components (if any) are as described above.

(c) Drying Step

The drying step is a step of drying the slurry on the three-dimensional structure applied in the slurry application step.

In the drying step, the slurry coating film applied to the three-dimensional structure is dried for 5 minutes to 10 hours and preferably 15 minutes to 3 hours at a temperature of preferably from 50 to 170° C. and more preferably from 70 to 150° C.

(d) Pore Connecting Step

In this step, the dried slurry coating film (catalyst precursor) obtained in (c) above is heat-treated (held) in air at a temperature not lower than −170° C. and not higher than −20° C. relative to the combustion decomposition temperature. As described above, this step causes the combustion and decomposition of the pore connecting agent and removes the pore connecting agent in the dried slurry coating film (catalyst precursor) as a mass of gas so as to form connected pores 2 and 3 and to link the connected pores 1, 2, and 3 to one another. In contrast, when the calcining step is performed after the drying step without a pore connecting step, the pore size distribution according to the present invention cannot be achieved. Note that when the calcining step is performed after the pore connecting step without a drying step, it may be difficult to make the pore sizes and the pore volumes of the connected pores conform to the preferable ranges described above.

Here, the heat treatment temperature in the pore connecting step (d) is higher than −170° C. and not higher than −20° C. relative to the combustion decomposition temperature. Note that the pore connecting agent starts to combust and decompose at around −50° C. of the combustion decomposition temperature. However, when the heat treatment temperature is not higher than −170° C. relative to the combustion decomposition temperature, the pore connecting agent does not combust sufficiently, and therefore, a sufficient amount of a mass of gas cannot be generated, and the pore connecting agent combusts at once in the following (e) calcining step. As a result, connected pores 2 having sufficient pore volume cannot be formed. In addition, when the heat treatment gas exceeds −20° C. relative to the combustion decomposition temperature, the pore connecting agent combusts at once, and excessively large pores are thus formed (the connected pores 2 are difficult to form or are not formed at all). As a result, the diffusibility of the exhaust gas is too high, and the CO that passes through without coming into contact with the catalyst components increases, resulting in a decrease in the CO purification rate. The heat treatment temperature is preferably not lower than −150° C. and not higher than −30° C., more preferably not lower than −120° C. and not higher than −40° C., and particularly preferably not lower than −100° C. and not higher than −50° C. relative to the combustion decomposition temperature. By allowing the pore connecting agent to combust at such a heat treatment temperature, the pore sizes and pore volumes of the connected pores 2 and 3 can be more easily controlled to within the preferable ranges described above. In addition, the heat treatment time is not particularly limited as long as pores having three different pore sizes as peaks are linked to one another to obtain the pore size distribution according to the present invention. The heat treatment time is preferably from 10 minutes to 3 hours and more preferably from 15 minutes to 1 hour. By allowing the pore connecting agent to combust for such a heat treatment time, the pore sizes and pore volumes of the connected pores 2 and 3 can be more easily controlled to within the preferable ranges described above.

In addition, the heat treatment in the pore connecting step (d) is preferably performed while circulating a gas such as air. This operation allows organic components (in particular, the pore connecting agent) to be removed more efficiently. Here, the rate at which the gas is circulated (gas flow rate) is not particularly limited but is preferably not less than 0.1 m/sec and more preferably from 0.2 to 1.2 m/sec.

(e) Calcining Step

In this step, the coating film is calcined after (d) described above. As a result, the catalyst components (precious metal, alumina, zeolite, and the like) are adhered to the three-dimensional structure. In addition, nitrogen containing components, hydrogen-containing components, and carbon-containing components remaining in the catalyst layer are removed.

Here, the calcining conditions are not particularly limited. For example, calcining is performed in air at a temperature of 440° C. to 800° C., preferably from 450° C. to 610° C., and more preferably from 450° C. to 555° C. for 10 minutes to 3 hours and preferably from 15 minutes to 1 hour. Under such conditions, the catalyst components (precious metal, alumina, zeolite, and the like) can be efficiently adhered to the three-dimensional structure.

In addition, calcining is preferably performed while circulating a gas such as air. This operation also allows organic components (in particular, the pore connecting agent) to be removed more efficiently. Here, the rate at which the gas is circulated (gas flow rate) is not particularly limited but is preferably not less than 0.1 m/sec and more preferably from 0.2 to 1.2 m/sec.

The catalyst of the present invention can be produced as described above. Note that when two catalyst layers are to be formed on the three-dimensional structure, the first slurry is first applied to the three-dimensional structure, and the steps of (c) to (e) described above are performed to form the lower catalyst layer. The second slurry is then applied to the lower catalyst layer, and the steps of (c) to (e) described above are performed to form the upper catalyst layer. As a result, an exhaust gas purification catalyst in which two layers including a lower catalyst layer and an upper catalyst layer are laminated on a three-dimensional structure can be produced. In addition, to increase the thickness of the catalyst layer, it is only necessary to repeat each of the steps of (a) to (e) described above using the same slurry. Note that in the mode described above, the configuration may be such that only one of the upper catalyst layer or the lower catalyst layer has the pore size distribution according to the present invention. This eliminates the need to perform the pore connecting step (d) when forming the lower catalyst layer or the upper catalyst layer. Note it is preferable for both the upper catalyst layer and the lower catalyst layer to have the pore size distribution according to the present invention.

Exhaust Gas Purification Method

The catalyst of the present invention can exhibit high purification performance with respect to exhaust gas, in particular, carbon monoxide (CO) in exhaust gas, emitted from a diesel engine. Therefore, the present invention also provides a diesel engine exhaust gas purification method. Such a method includes treating exhaust gas (in particular, purifying carbon monoxide (CO) in exhaust gas) emitted from a diesel engine using the exhaust gas purification catalyst of the present invention. In order to measure the exhaust gas purification rate using a diesel engine, it is preferable to use an evaluation mode for exhaust gas regulations such as the NEDC mode, the JC08 mode, WLTC, FTP75, FTP1199, NRTC, or the NRSC mode. For example, when an evaluation is performed in the NEDC mode, the evaluation is performed in accordance with the United Nations Economic Commission for Europe, Addendum 82: Regulation No. 83. In addition, the CO conversion rate (%) is calculated in accordance with the following formula (I).

(Mathematical Formula 1)

$$\text{CO Conversion Rate } [\%] = \frac{c(CO)_{in} - c(CO)_{out}}{c(CO)_{in}} \times 100 \quad \text{Formula (I)}$$

In formula (I), $c(CO)_{in}$ represents the concentration of CO at the catalyst inlet; and $c(CO)_{out}$ represents the concentration of CO at the catalyst outlet.

Here, the CO concentration in the exhaust gas is not particularly limited but is preferably from 10 to 50000 volume ppm, more preferably from 50 to 15000 volume ppm, and even more preferably from 50 to 5000 volume ppm. In addition, even if the exhaust gas contains HC and NOx in addition to CO, the exhaust gas can be treated, and in this case, the exhaust gas can be treated even more efficiently by using a catalyst containing the other added components described above.

In the mode described above, the HC concentration in the exhaust gas is not particularly limited but is preferably from 1 to 50000 volume ppm, more preferably from 50 to 10000 volume ppm, and even more preferably from 50 to 1000 volume ppm. In addition, the NO concentration in the exhaust gas is also not particularly limited but is preferably from 1 to 10000 volume ppm, more preferably from 10 to 5000 volume ppm, and even more preferably from 20 to 1000 volume ppm.

Further, exhaust gas emitted from a diesel engine contains a particulate component (particulate matter, PM). Therefore, it is preferable to use a three-dimensional structure having a filter function in order to remove PM. Alternatively, a filter for removing PM may be provided separately.

The space velocity (SV) of the exhaust gas may be a normal velocity but is preferably from 1000 to 500000 $hr^{-1}$ and more preferably from 5000 to 200000 $hr^{-1}$. In addition, the gas linear velocity may be a normal velocity, however, contact is preferably made at a rate of 0.1 to 8.5 m/sec and more preferably from 0.2 to 6.7 m/sec.

Further, the catalyst of the present invention can maintain and exhibit excellent purification performance (in particular, high CO conversion activity) for low-temperature exhaust gas. Specifically, the catalyst of the present invention can exhibit an excellent exhaust gas treating effect (in particular, CO purification properties) for low-temperature exhaust gas of 50 to 600° C. Similarly, the catalyst of the present invention can maintain and exhibit excellent purification performance (in particular, high CO conversion activity) even when exposed to high-temperature exhaust gas for a long period of time. Specifically, the catalyst of the present invention can exhibit an excellent exhaust gas treating effect (in particular, CO purification properties) for exhaust gas having a low temperature of 50 to 600° C. after having been exposed for a long period of time to exhaust gas having a high temperature of 650 to 900° C. (in particular, including HC, CO, NOx, water vapor, or the like) from an internal combustion engine. Therefore, for example, even when the exhaust gas purification catalyst is installed in the exhaust passage of the exhaust port of an internal combustion engine (diesel engine) and high-temperature exhaust gas is allowed to flow into the exhaust passage for a long period of time, the exhaust gas (in particular, CO) can be removed efficiently.

Thus, the catalyst of the present invention described above, or a catalyst produced by the method described above may be exposed to exhaust gas having a temperature of 650 to 900° C. and preferably from 700 to 850° C. Further, the amount of time that the catalyst of the present invention is exposed to high-temperature exhaust gas (amount of time that the exhaust gas is allowed to flow) is also not particularly limited but is, for example, from 10 to 800 hours, preferably from 16 to 500 hours, and more preferably from 40 to 100 hours. Even after being exposed to such a high-temperature exhaust gas, the catalyst of the present invention has high performance. In order to investigate the exhaust gas purification performance of the catalyst after being exposed to high-temperature exhaust gas in this way, it is effective to subject the catalyst to treatment involving exposure to exhaust gas at 650 to 900° C. for 10 to 300 hours as thermal aging and to then evaluate the exhaust gas purification performance (resistance to catalyst deterioration).

Note that in the present specification, the "temperature of the exhaust gas" refers to the temperature of the exhaust gas at the catalyst inlet. Here, the "catalyst inlet" refers to a portion extending 10 cm from the catalyst end face on the exhaust gas inflow side toward the internal combustion engine side in the exhaust pipe in which the exhaust gas purification catalyst is installed, and also refers to the location of the center portion in the longitudinal direction (axial direction) of the exhaust pipe. In addition, in the present specification, the "catalyst bed" refers to a center portion between the catalyst end face on the exhaust gas inflow side and the catalyst end face on the exhaust gas outflow side in the exhaust pipe, and also refers to the location of the center portion of a cross section of the exhaust pipe (when the cross section of the exhaust pipe is not circular, this is the location of the center of gravity of the cross section of the exhaust pipe).

EXAMPLES

The effects of the present invention will be described using the following examples and comparative examples. However, the technical scope of the present invention is not limited to the following examples. Note that in the following examples, unless indicated otherwise, operations were performed at room temperature (25° C.). In addition, unless indicated otherwise, "%" and "parts" refer to "mass %" and "parts by mass", respectively.

Example 1

First, 3250 g of powdered silica-containing alumina (BET specific surface area: 180 m²/g, average secondary particle size: 45 µm) and 168 g of methyl polymethacrylate (average particle size: 2 µm) serving as a pore connecting agent were added to 5.4 L (liters, expressed as "L" hereinafter) of deionized water and stirred for 30 minutes to prepare a slurry A-1. Next, 575.8 g of a mixed solution obtained by diluting an aqueous solution containing dinitrodiammine platinum in an amount corresponding to 38.1 g of platinum and an aqueous solution containing palladium nitrate in an amount corresponding to 19.1 g of palladium with deionized water was added to the slurry A-1 and stirred for two hours to prepare a slurry A-2. Further, 1301.2 g of powdered beta-zeolite (silica/alumina ratio (molar ratio): 35 to 40, BET specific surface area: 582 m²/g, average secondary particle size: 0.4 to 0.6 µm) was added and mixed with the slurry A-2, and the pH was adjusted to 7 or higher and lower than 8 using nitric acid to prepare a slurry A-3. Next, the slurry A-3 was wet-milled for 30 minutes at a rotational speed of 200 rpm using a wet mill (ball mill) to prepare a slurry A. Note that the methyl polymethacrylate content (in terms of solid content) in the slurry A is 3.5 mass %. In addition, the average secondary particle size of the solid content in the slurry A is 5.0 µm.

This slurry A was wash-coated onto a cylindrical 1.3 L cordierite carrier (number of cells: 400 cells per 1 square inch of cross-sectional area) having a diameter of 118.4 mm and a length of 118 mm to obtain a precursor A.

Next, the precursor A was dried for 20 minutes at 150° C. to obtain a precursor B. Further, the precursor B was held (heat-treated) in air for 20 minutes at 280° C. (pore connecting step), and the pore connecting agent was subjected to combustion decomposition to obtain a precursor C. Next, the precursor C was calcined in air for one hour at 500° C. to obtain a catalyst A. Note that the catalyst A obtained in this way is one in which the cordierite carrier was coated with 141.7 g of catalyst components (1.13 g of platinum, 0.57 g of palladium, 100 g of silica-containing alumina, and 40 g of beta-zeolite) per 1 L of the carrier.

In addition, the combustion decomposition temperature of methyl polymethacrylate (pore connecting agent) was measured to be 373° C. with the following method using a thermogravimetry-differential thermal analyzer (TG-DTA). Note that methyl polymethacrylate (pore connecting agent) began to combust at around 321° C.

—Method for Measuring Combustion Decomposition Temperature of Pore Connecting Agent—

First, 30 mg of the pore connecting agent(sample) is placed on the balance of a TGA (manufactured by Bruker AXS, trade name: TG-DTA2020SR) through which a carrier gas (air) is circulated, and after the baseline stabilizes, the differential heat is measured when the sample undergoes combustion decomposition under conditions in which the sample is heated from 25° C. to 800° C. at a rate of 10°/min under an air flow of 100 ml/min. Here, combustion decomposition refers to a state in which differential heat of 100 µV or greater per 30 mg of the sample is generated in the DTA profile of the TG-DTA measurement data, and no more differential heat is generated thereafter. The temperature at which the above state (state of maximum differential heat) is indicated is referred to as the "combustion decomposition temperature (° C.) of the pore connecting agent".

Example 2

A catalyst B was obtained in accordance with the same method as in Example 1 with the exception that the added amount of methyl polymethacrylate (average particle size: 2 µm) in Example 1 was changed to 336 g. Note that the methyl polymethacrylate content (in terms of solid content) in the slurry A is 6.8 mass %.

Example 3

A catalyst C was obtained in accordance with the same method as in Example 1 with the exception that the added amount of methyl polymethacrylate (average particle size: 2 µm) in Example 1 was changed to 504 g. Note that the methyl polymethacrylate content (in terms of solid content) in the slurry A is 9.8 mass %.

Comparative Example 1

A catalyst D was obtained in accordance with the same method as in Example 1 with the exception that methyl polymethacrylate (average particle size: 2 µm) was not added in Example 1. Note that the methyl polymethacrylate content (in terms of solid content) in the slurry A is 0 mass %.

Example 4

A catalyst E was obtained in accordance with the same method as in Example 1 with the exception that 168 g of methyl polymethacrylate (average particle size: 4 µm) was used instead of 168 g of methyl polymethacrylate (average particle size: 2 µm) in Example 1. Note that the methyl polymethacrylate content (in terms of solid content) in the slurry A is 3.5 mass %.

Example 5

A catalyst F was obtained in accordance with the same method as in Example 1 with the exception that 168 g of methyl polymethacrylate (average particle size: 10 µm) was used instead of 168 g of methyl polymethacrylate (average particle size: 2 µm) in Example 1. Note that the methyl polymethacrylate content (in terms of solid content) in the slurry A is 3.5 mass %.

Example 6

A catalyst G was obtained in accordance with the same method as in Example 1 with the exception that 336 g of rice starch (average particle size: 2 µm) was used instead of 168 g of methyl polymethacrylate (average particle size: 2 µm) in Example 1. Note that the amount of rice starch (in terms of solid content) in the slurry A is 6.8 mass %.

In addition, the combustion decomposition temperature of the rice starch (pore connecting agent) was measured to be 320° C. in the same manner as in the method described in Example 1. Note that the rice starch (pore connecting agent) began to combust at around 268° C.

Comparative Example 2

A catalyst H was obtained in accordance with the same method as in Example 1 with the exception that 336 g of polyoxybenzyl methylene glycol anhydride (average particle size: 2 µm) was used instead of 168 g of methyl polymethacrylate (average particle size: 2 µm) in Example 1. Note that the amount of polyoxybenzyl methylene glycol anhydride (in terms of solid content) in the slurry A is 6.8 mass %.

In addition, the combustion decomposition temperature of the polyoxybenzyl methylene glycol anhydride (pore connecting agent) was measured to be 450° C. in the same manner as in the method described in Example 1. Note that the polyoxybenzyl methylene glycol anhydride (pore connecting agent) began to combust at around 400° C.

Note that in the catalysts A to H, when the amount of each component per 1 liter of the cordierite carrier is expressed as g/L, 1.13 g/L of Pt (in terms of metal), 0.57 g/L of Pd (in terms of metal), 100 g/L of silica-containing alumina, and 40 g/L of beta-zeolite were supported in a single layer on the cordierite carrier.

Figure 2:
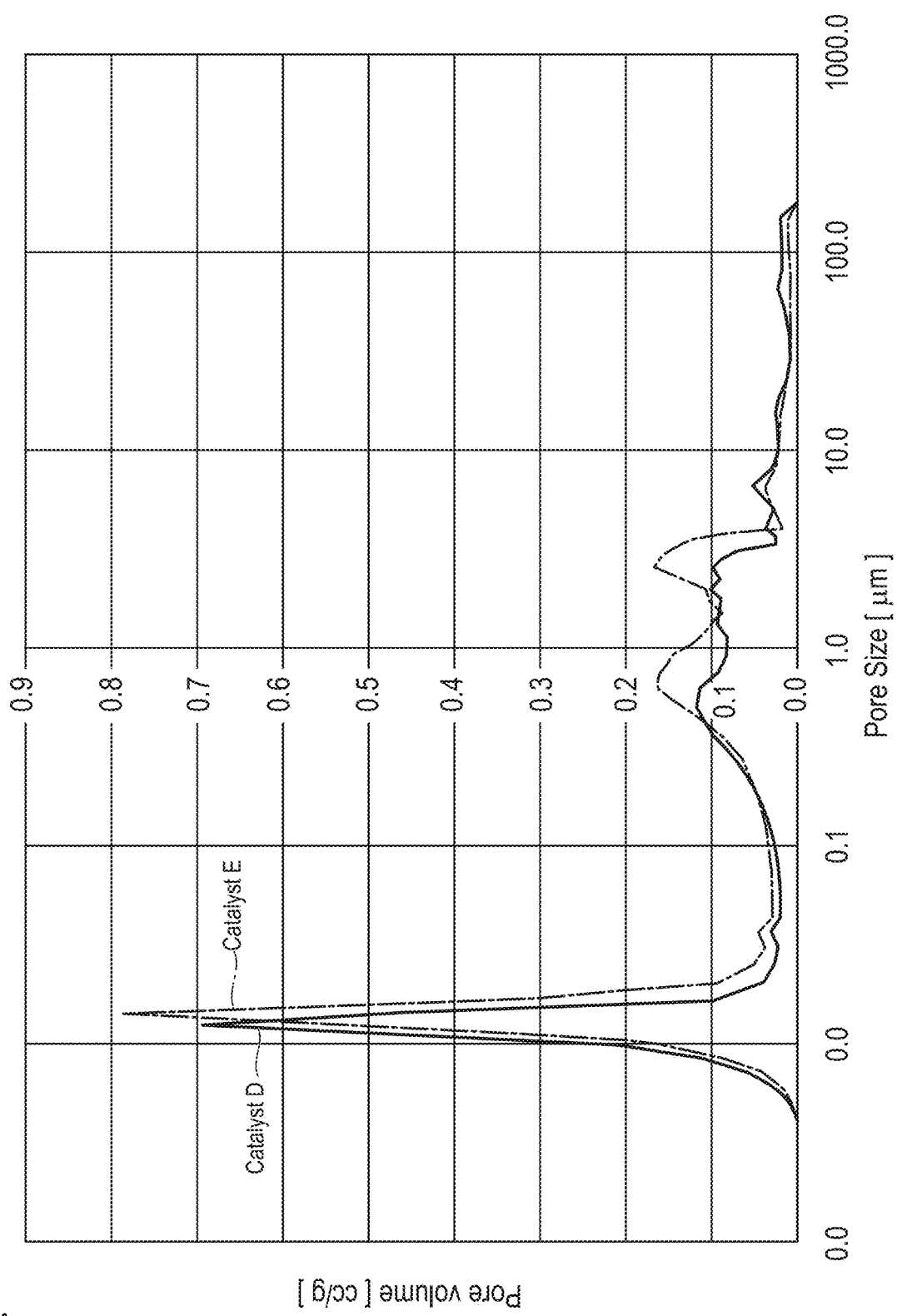
FIG. 2 shows pore size distributions of catalysts E (Example 5) and D (Comparative Example 1).

The pore size distributions of the catalysts A to H obtained as described above were measured with the mercury intrusion method as follows. The pore size distributions of catalysts D and E are shown in FIG. 2. In addition, the pore sizes of the connected pores 1, 2, and 3 and the ratio (%) of the volume of each of the pores to the total pore volume were determined as follows. The results are shown in the following Table 1. Note that, in Table 1 below, the type, the average particle size (μm), the combustion decomposition temperature (° C.), the difference between the heat treatment temperature and the combustion decomposition temperature (° C.) [=heat treatment temperature (° C.)–combustion decomposition temperature (° C.)] ("temperature difference (° C.)" in Table 1 below), and the used amount (mass % (in terms of solid content)) of each pore connecting agent used in each example and each comparative example are also shown.

—Pore Size Distribution Measurement—

The pore size distributions of catalysts A to H (samples) were measured by the mercury intrusion method. Specifically, a 600 mg sample was measured using a porosimeter (manufactured by the Shimadzu Corporation, trade name: Autopore III 9420). For the connected pores 1, 2, and 3 of each catalyst, the pore size (pore diameter) of each peak and the ratio (%) of the pore volume of the peak to the total pore volume were determined. The results are shown in Table 1.

higher CO conversion rate than the catalyst D of Comparative Example 1 and the catalyst H of Comparative Example 2.

Example 7

Using dinitrodiammine platinum as a Pt source, palladium nitrate as a Pd source, powdered silica-containing alumina (BET specific surface area: 180 m²/g, average secondary particle size: 45 μm) as an alumina raw material, powdered beta-zeolite (silica/alumina ratio (molar ratio): 35 to 40, BET specific surface area: 582 m²/g, average secondary particle size: 0.4 to 0.6 μm) as a zeolite raw material, lanthanum oxide ($La_2O_3$) as a lanthanum oxide raw material, and methyl polymethacrylate (average particle size: 4 μm) as a pore connecting agent, each raw material was weighed such that the mass ratio of Pt:Pd:silica-containing alumina ($Al_2O_3$):beta-zeolite:$La_2O_3$:methyl polymethacrylate was 0.83:0.42:50:27:2:8. After each weighed raw mate-

TABLE 1

| Catalyst | Pore Connecting Agent | Average particle size (μm) | Combustion degradation temperature [° C.] | Temperature difference*[1] [° C.] | Used amount [mass %] |
|---|---|---|---|---|---|
| A | Methyl polymethacrylate | 2 | 373 | −93 | 3.5 |
| B | Methyl polymethacrylate | 2 | 373 | −93 | 6.8 |
| C | Methyl polymethacrylate | 2 | 373 | −93 | 9.8 |
| D | Not used | — | — | — | 0 |
| E | Methyl polymethacrylate | 4 | 373 | −93 | 3.5 |
| F | Methyl polymethacrylate | 10 | 373 | −93 | 3.5 |
| G | Rice starch | 2 | 320 | −40 | 6.8 |
| H | Polyoxybenzyl methylene glycol anhydride | 2 | 450 | −170 | 6.8 |

| | Connected pores 1 | | Connected pores 2 | | Connected pores 3 | |
|---|---|---|---|---|---|---|
| Catalyst | Peak 1 pore size (μm) | Ratio with respect to total pore volume [%] | Peak 2 pore size (μm) | Ratio with respect to total pore volume [%] | Peak 3 pore size (μm) | Ratio with respect to total pore volume [%] |
| A | 0.0124 | 16.8 | 0.76 | 3.7 | 2.23 | 3.1 |
| B | 0.0124 | 17.0 | 0.76 | 4.0 | 2.83 | 3.6 |
| C | 0.0124 | 15.3 | 0.62 | 4.9 | 3.09 | 4.8 |
| D | 0.0124 | 16.9 | 0.51 | 2.9 | 1.98 | 2.4 |
| E | 0.0143 | 15.6 | 0.62 | 3.2 | 2.55 | 3.3 |
| F | 0.0143 | 15.5 | 0.76 | 3.6 | 2.54 | 2.7 |
| G | 0.0124 | 16.1 | 0.93 | 3.6 | 2.24 | 3.3 |
| H | 0.0124 | 15.3 | 0.75 | 3.1 | 2.56 | 3.1 |

*[1]Difference between the heat treatment temperature and the combustion decomposition temperature (° C.) [=heat treatment temperature (° C.) − combustion decomposition temperature (° C.)]

Exhaust Gas Purification Performance Evaluation Test 1

The exhaust gas purification performance (CO purification properties) was evaluated as follows for the catalysts A to H of Examples 1 to 6 and Comparative Examples 1 and 2. Specifically, each catalyst (1.3 L) was subjected to thermal aging treatment (durability treatment) using an electric furnace for 50 hours at 700° C. in an air atmosphere. After thermal aging treatment, each catalyst was cooled to room temperature (25° C.) and then placed at a position 100 cm behind the exhaust port of a 3.0 L turbo diesel engine. An NEDC mode evaluation was performed, and the CO conversion rate (%) of each catalyst was measured. In addition, the exhaust gas temperature of the catalyst was within the range of 25 to 380° C.

Figure 3:
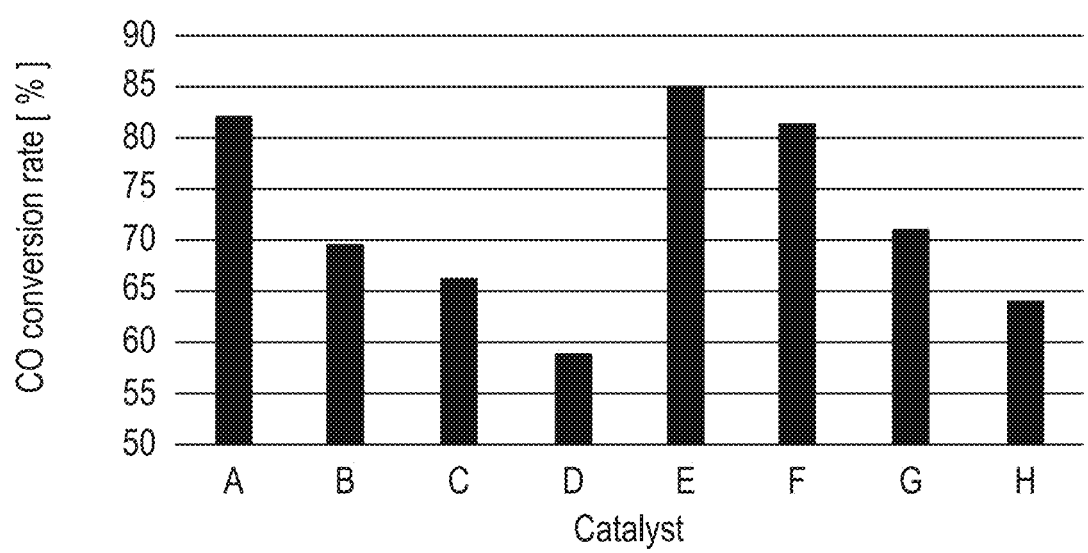
FIG. 3 is a graph showing exhaust gas (CO) purification rates of the catalysts of the examples and the comparative examples.

The results (CO conversion rate of each catalyst) are shown in FIG. 3. It can be seen from FIG. 3 that the catalysts A to C and E to G of Examples 1 to 6 exhibit a significantly rial was added to deionized water and stirred for 30 minutes, the pH was adjusted to 7 or higher and lower than 8 by adding nitric acid to produce a mixed dispersion j1. Next, the mixed dispersion j1 was wet-milled with a ball mill for 30 minutes at a rotational speed of 200 rpm to produce a slurry J1. Note that the methyl polymethacrylate content (in terms of solid content) in the slurry J1 is 9.1 mass %. In addition, the average secondary particle size of the solid content in the slurry J1 is 5.0 μm, and the content (in terms of solid content) of the pore connecting agent is equivalent to 10.0 mass % (8 parts by mass) with respect to the total solid content in the upper catalyst layer (total solid content in the upper catalyst layer when heated at 1000° C., 80.25 parts by mass).

Next, the slurry J1 was wash-coated onto a cylindrical 1.3 L cordierite carrier (number of cells: 400 cells per 1 square inch of cross-sectional area) having a diameter of 118.4 mm and a length of 118 mm such that the supported amount after calcining was 80.25 g per 1 liter of the cordierite carrier, and this was then dried for 20 minutes at 150° C. Next, the sample was held (heat-treated) in air for 20 minutes at 280° C. (pore connecting step), and the pore connecting agent was subjected to combustion decomposition. Next, this was calcined for one hour at 500° C. in air to obtain a precursor J having a lower catalyst layer formed on the cordierite carrier.

Next, using dinitrodiammine platinum as a Pt source, palladium nitrate as a Pd source, powdered silica-containing alumina (BET specific surface area: 180 m²/g, average secondary particle size: 45 μm) as an alumina raw material, lanthanum oxide (La$_2$O$_3$) as a lanthanum oxide raw material, and methyl polymethacrylate (average particle size: 4 μm) as a pore connecting agent, each raw material was weighed such that the mass ratio of Pt:Pd:silica-containing alumina (Al$_2$O$_3$):La$_2$O$_3$:methyl polymethacrylate was 1.5:0.25:65:2:6.8. After each weighed raw material was added to deionized water and stirred for 30 minutes, the pH was adjusted to 7 or higher and lower than 8 by adding nitric acid to produce a mixed dispersion j2. Next, the mixed dispersion j2 was wet-milled with a ball mill for 30 minutes at a rotational speed of 200 rpm to produce a slurry J2 (solid content mass concentration=26 mass %). Note that the methyl polymethacrylate content (in terms of solid content) in the slurry J2 is 9.0 mass %. In addition, the average secondary particle size of the solid content in the slurry J2 is 5.0 μm, and the content (in terms of solid content) of the pore connecting agent is equivalent to 9.9 mass % (6.8 parts by mass) with respect to the total solid content in the upper catalyst layer (total solid content in the upper catalyst layer when heated at 1000° C., 68.75 parts by mass).

Next, the slurry J2 was wash-coated onto the precursor J such that the supported amount after calcining was 68.75 g per 1 liter of the cordierite carrier, and this was then dried for 20 minutes at 150° C. Next, the sample was held (heat-treated) in air for 20 minutes at 280° C. (pore connecting step), and the pore connecting agent was subjected to combustion decomposition. Next, this was calcined for one hour at 500° C. in air to obtain a catalyst J having a lower catalyst layer and an upper catalyst layer formed on the cordierite carrier. Note that in the catalyst J, a lower catalyst layer containing 0.83 g/L of Pt (in terms of metal), 0.42 g/L of Pd (in terms of metal), 50 g/L of silica-containing alumina (Al$_2$O$_3$) (in terms of oxide), 27 g/L of beta-zeolite (in terms of oxide), and 2 g/L of La$_2$O$_3$ (in terms of oxide) and an upper catalyst layer containing 1.5 g/L of Pt (in terms of metal), 0.25 g/L of Pd (in terms of metal), 65 g/L of silica-containing alumina (Al$_2$O$_3$) (in terms of oxide), and 2 g/L of La$_2$O$_3$ (in terms of oxide) are formed on the cordierite support.

Comparative Example 3

Using dinitrodiammine platinum as a Pt source, palladium nitrate as a Pd source, powdered silica-containing alumina (BET specific surface area: 180 m²/g, average secondary particle size: 45 μm) as an alumina raw material, powdered beta-zeolite (silica/alumina ratio (molar ratio): 35 to 40, BET specific surface area: 582 m²/g, average secondary particle size: 0.4 to 0.6 μm) as a zeolite raw material, and lanthanum oxide (La$_2$O$_3$) as a lanthanum oxide raw material, each raw material was weighed such that the mass ratio of Pt:Pd:silica-containing alumina (Al$_2$O$_3$):beta-zeolite:La$_2$O$_3$ was 0.83:0.42:50:27:2. After each weighed raw material was added to deionized water and stirred for 30 minutes, the pH was adjusted to 7 or higher and lower than 8 by adding nitric acid to produce a mixed dispersion k1. Next, the mixed dispersion k1 was wet-milled with a ball mill for 30 minutes at a rotational speed of 200 rpm to produce a slurry K1 (solid content mass concentration=35 mass %). Note that the average secondary particle size of the solid content in the slurry K1 was 5.0 μm.

Next, the slurry K1 was wash-coated onto a cylindrical 1.3 L cordierite carrier (number of cells: 400 cells per 1 square inch of cross-sectional area) having a diameter of 118.4 mm and a length of 118 mm such that the supported amount after calcining was 80.25 g per 1 liter of the cordierite carrier. Next, after this was dried for 20 minutes at 150° C., it was calcined for one hour at 500° C. in air to obtain a precursor K having a lower catalyst layer formed on the cordierite carrier.

Next, using dinitrodiammine platinum as a Pt source, palladium nitrate as a Pd source, powdered silica-containing alumina (BET specific surface area: 180 m²/g, average secondary particle size: 45 μm) as an alumina raw material, and lanthanum oxide (La$_2$O$_3$) as a lanthanum oxide raw material, each raw material was weighed such that the mass ratio of Pt:Pd:silica-containing alumina (Al$_2$O$_3$):La$_2$O$_3$ was 1.5:0.25:65:2. After each weighed raw material was added to deionized water and stirred for 30 minutes, the pH was adjusted to 7 or higher and lower than 8 by adding nitric acid to produce a mixed dispersion k2. Next, the mixed dispersion k2 was wet-milled with a ball mill for 30 minutes at a rotational speed of 200 rpm to produce a slurry K2. Note that the average secondary particle size of the solid content in the slurry K2 is 5.0 μm.

Next, the slurry K2 was wash-coated onto the precursor K such that the supported amount after calcining was 68.75 g per 1 liter of the cordierite carrier. Next, after this was dried for 20 minutes at 150° C., it was calcined for one hour at 500° C. in air to obtain a catalyst K having a lower catalyst layer and an upper catalyst layer formed on the cordierite carrier.

Note that in the catalysts J and K, when the amount of each component per 1 liter of the cordierite carrier is expressed as g/L, a lower catalyst layer containing 0.83 g/L of Pt (in terms of metal), 0.42 g/L of Pd (in terms of metal), 50 g/L of silica-containing alumina (Al$_2$O$_3$) (in terms of oxide), 27 g/L of beta-zeolite (in terms of oxide), and 2 g/L of lanthanum oxide (La$_2$O$_3$) (in terms of oxide) and an upper catalyst layer containing 1.5 g/L of Pt (in terms of metal), 0.25 g/L of Pd (in terms of metal), 65 g/L of silica-containing alumina (Al$_2$O$_3$) (in terms of oxide), and 2 g/L of lanthanum oxide (La$_2$O$_3$) (in terms of oxide) are formed on the cordierite support as two catalyst layers in the order from the lower catalyst layer to the upper catalyst layer.

For the catalysts J and K obtained as described above, the pore size distribution was measured, and the pore sizes of the connected pores 1, 2, and 3 and the ratio (%) of the volume of each pore to the total pore volume were determined in the same manner as in Example 1. The results are shown in the following Table 2. Note that, in Table 2 below, the type, the average particle size (μm), the combustion decomposition temperature (° C.), the difference between the heat treatment temperature and the combustion decomposition temperature (° C.) [=heat treatment temperature (° C.)−combustion decomposition temperature (° C.)] ("temperature difference (° C.)" in Table 1 below), and the used amount (mass % (in terms of solid content)) of each pore connecting agent used in Example 7 and Comparative Example 3 are also shown.

TABLE 2

| Catalyst | Pore Connecting Agent | Average particle size (μm) | Combustion degradation temperature [° C.] | Temperature difference*[1] [° C.] | Used amount [mass %] |
|---|---|---|---|---|---|
| J | Methyl polymethacrylate (lower catalyst layer) | 4 | 373 | −93 | 9.1 |
|   | Methyl polymethacrylate (upper catalyst layer) | 4 | 373 | −93 | 9.0 |
| K | Not used | — | — | — | 0 |

| | Connected pores 1 | | Connected pores 2 | | Connected pores 3 | |
|---|---|---|---|---|---|---|
| Catalyst | Peak 1 pore size (μm) | Ratio with respect to total pore volume [%] | Peak 2 pore size (μm) | Ratio with respect to total pore volume [%] | Peak 3 pore size (μm) | Ratio with respect to total pore volume [%] |
| J | 0.0143 | 11.4 | 0.76 | 5.1 | 2.55 | 3.5 |
| K | 0.0166 | 12.6 | 0.76 | 3.0 | 2.56 | 1.8 |

*[1]Difference between the heat treatment temperature and the combustion decomposition temperature (° C.)
[=heat treatment temperature (° C.) − combustion decomposition temperature (° C.)]

Exhaust Gas Purification Performance Evaluation Test 2

The exhaust gas purification performance (CO purification properties) was evaluated as follows for the catalyst J of Example 7 and the catalyst K of Comparative Example 3 having the same amount of precious metal. Specifically, each catalyst (1.3 L) was subjected to thermal aging (durability treatment) using an electric furnace for 50 hours at 800° C. in an air atmosphere. After thermal aging, each catalyst was cooled to room temperature (25° C.) and then placed at a position 100 cm behind the exhaust port of a 3.0 L turbo diesel engine. An NEDC mode evaluation was performed, and the CO conversion rate (%) of each catalyst was measured. In addition, the exhaust gas temperature of the catalyst was within the range of 25 to 380° C. Note that the test conditions of this evaluation test 2 are more stringent than the conditions of the evaluation test 1 described above.

The results (CO conversion rate of each catalyst) are shown in Table 3. It can be seen from Table 3 that the catalyst J of Example 7 exhibits a significantly higher CO conversion rate than the catalyst K of Comparative Example 3. In addition, the catalyst J of Example 7 can exhibit a high CO conversion rate even under quite stringent conditions.

TABLE 3

| | CO conversion rate |
|---|---|
| Catalyst J | 87.0% |
| Catalyst K | 78.8% |

Reference Example 1: Confirmation of Pores Derived from the Pore Connecting Agent Elemental analysis was performed on the catalyst A produced in Example 1 and the catalyst D produced in Comparative Example 1, and the amounts of carbon in the catalysts were measured. Note that samples A' and D' were respectively prepared by cutting the catalysts A and D, collecting central portions 50 to 70 mm from the end faces of the catalysts near the centers of the catalysts, and peeling the catalyst layers from the collected samples while using a microscope, and elemental analysis was performed for these samples. Elemental analysis was performed using a fully automatic elemental analyzer Vario EL Cube (manufactured by Elementar) in accordance with the manufacturer's instructions.

As a result, no amount of carbon was detected in the sample D' ($C_D$), and the amount of carbon detected in the sample A' ($C_A$) was 0.04 mass %. Since the same operations were performed with the exception of the use of the pore connecting agent, the increase in the amount of carbon is considered to be due to the pore connecting agent. In addition, when the above results are considered together with the results of Table 1 above, it is considered that the connected pores 2 accounting for a proportion of pore volume exceeding 3.1% of the total pore volume can be achieved by using a pore connecting agent having a specific combustion degradation temperature under specific pore connecting conditions in accordance with the method of the present invention.

The present application is based on Japanese Patent Application No. 2018-212051 filed on Nov. 12, 2018, the disclosed content of which is incorporated by reference in its entirety.

DESCRIPTION OF REFERENCE NUMERALS

10, 10', 10" . . . Catalyst
12 . . . Exhaust gas
13 . . . Pores having a large pore size
13' . . . Pores having a small pore size
1 . . . Pores having a small pore size (connected pores 1)
2 . . . Pores having an intermediate pore size (connected pores 2)
3 . . . Pores having a large pore size (connected pores 3)
14, 14', 14" . . . Catalyst layer
15, 15', 15" . . . Three-dimensional structure

What is claimed is:

1. A diesel engine exhaust gas purification catalyst for purifying exhaust gas emitted from a diesel engine; the catalyst comprising precious metal and alumina and/or zeolite supported on a three-dimensional structure; the catalyst having peaks for not less than three different pore sizes in a pore size distribution measured by mercury intrusion method; one of the peaks being a peak 2 at a pore size of not less than 0.3 μm and less than 1.0 μm; and the pore volume of peak 2 being greater than 3.1% of the total pore volume.

2. The exhaust gas purification catalyst according to claim 1, wherein the pore size distribution has a peak 3 at a pore size of not less than 1.5 μm and not greater than 3.5 μm, and the pore volume at the pore size of peak 3 is not greater than 4.5% of the total pore volume.

3. The exhaust gas purification catalyst according to claim 1, wherein the precious metal is platinum and palladium.

4. The exhaust gas purification catalyst according to claim 1, wherein at least two catalyst layers are laminated and supported on a three-dimensional structure.

5. A production method for a diesel engine exhaust gas purification catalyst, the method comprising: preparing a slurry by mixing a pore connecting agent having a combustion decomposition temperature of not lower than 300° C. and lower than 450° C., a precious metal precursor, and at least one of alumina and zeolite; applying the slurry to a three-dimensional structure; and then holding the three-dimensional structure in air at a temperature higher than −170° C. and not higher than −20° C. relative to the combustion decomposition temperature.

6. The method according to claim 5, wherein the average particle size of the pore connecting agent is greater than 1 μm and less than 10 μm.

7. The method according to claim wherein the content of the pore connecting agent in the slurry is not greater than 6 mass % in terms of solid content.

8. The method according to claim 5, wherein slurries having a pore connecting agent content of not greater than 15 mass % in terms of solid content are laminated on the three-dimensional structure as at least two different catalyst layers.

9. A diesel engine exhaust gas purification method, the method comprising treating exhaust gas emitted from a diesel engine using the exhaust gas purification catalyst according to claim 1.

\* \* \* \* \*